US012720376B2

United States Patent
(12) United States Patent
You et al.

(10) Patent No.: US 12,720,376 B2
(45) Date of Patent: Aug. 25, 2026

(54) RESOURCE PROCESSING METHOD AND APPARATUS

(71) Applicant: GUANGDONG OPPO MOBILE TELECOMMUNICATIONS CORP., LTD., Dongguan (CN)

(72) Inventors: Xin You, Dongguan (CN); Xue Lin, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 310 days.

(21) Appl. No.: 18/385,049

(22) Filed: Oct. 30, 2023

(65) Prior Publication Data

US 2024/0064584 A1 Feb. 22, 2024

Related U.S. Application Data

(63) Continuation of application No. PCT/CN2021/107722, filed on Jul. 21, 2021.

(51) Int. Cl.
*H04W 36/00* (2009.01)
*H04W 72/0457* (2023.01)
*H04W 72/12* (2023.01)

(52) U.S. Cl.
CPC . *H04W 36/0061* (2013.01); *H04W 36/00725* (2023.05); *H04W 72/0457* (2023.01); *H04W 72/12* (2013.01)

(58) Field of Classification Search
CPC ............. H04W 36/08; H04W 74/0833; H04W 36/00725; H04W 72/046; H04W 72/232; H04W 72/231; H04W 16/28
See application file for complete search history.

(56) References Cited

U.S. PATENT DOCUMENTS 11,122,629 B2 9/2021 Chen
2020/0260500 A1* 8/2020 Agiwal ............. H04W 28/0278
(Continued)

FOREIGN PATENT DOCUMENTS

CN 109392178 A 2/2019
CN 109804666 A 5/2019
(Continued)

OTHER PUBLICATIONS

Supplementary European Search Report in the European application No. 21950491.7, mailed on Jun. 5, 2024. 11 pages.
(Continued)

*Primary Examiner* — Tu X Nguyen
(74) *Attorney, Agent, or Firm* — BAYES PLLC

(57) ABSTRACT

A resource processing method and apparatus are provided. The method comprises: receiving first configuration information from a network device, wherein the first configuration information is used for instructing a terminal device to execute a first type of handover, and the first configuration information comprises resource configuration information used for executing the first type of handover, the resource configuration information comprising an association relationship between at least one uplink resource and at least one wave beam; and determining a transmission resource according to the resource configuration information, wherein the transmission resource is used for the terminal device to send uplink data.

20 Claims, 9 Drawing Sheets

(56) References Cited

U.S. PATENT DOCUMENTS

2020/0314709 A1 10/2020 Ly et al.
2020/0314812 A1* 10/2020 Xu ........................ H04W 52/40
2020/0329503 A1 10/2020 Da Silva
2020/0344651 A1 10/2020 Yang
2020/0389886 A1 12/2020 Lee et al.
2021/0007145 A1 1/2021 Chen
2021/0176677 A1 6/2021 Lee et al.
2022/0015131 A1 1/2022 Cheng
2022/0150777 A1 5/2022 Bergqvist et al.
2023/0388872 A1 11/2023 Ly et al.

FOREIGN PATENT DOCUMENTS

CN 111083747 A 4/2020
CN 111418255 A 7/2020
CN 112312487 A 2/2021
CN 113170363 A 7/2021
WO 2019136611 A1 7/2019
WO 2020167185 A1 8/2020

OTHER PUBLICATIONS

International Search Report in the international application No. PCT/CN2021/107722, mailed on Mar. 28, 2022. 5 pages with English translation.

Written Opinion of the International Search Authority in the international application No. PCT/CN2021/107722, mailed on Mar. 28, 2022. 8 pages with English translation.

3GPP TS 36.300 V15.8.0 (Dec. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15). chapter 10.1.2.1. 365 pages.

* cited by examiner

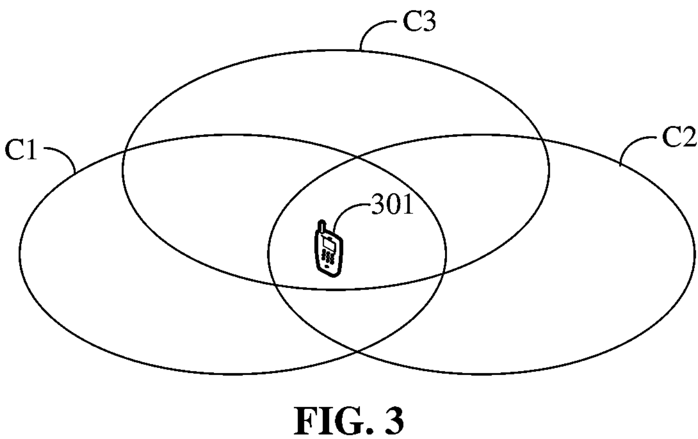
FIG. 3
Terminal device
Network device
S401、Msg1
S402、Msg2
S403、Msg3
S404、Msg4
FIG. 4
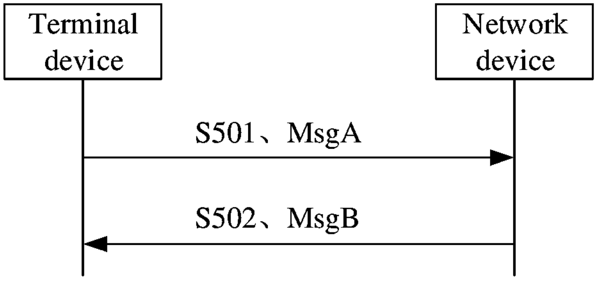
FIG. 5

RESOURCE PROCESSING METHOD AND APPARATUS

CROSS-REFERENCE TO RELATED APPLICATION

This is a continuation application of International Patent Application No. PCT/CN2021/107722, filed on Jul. 21, 2021, the content of which is hereby incorporated by reference in its entirety.

BACKGROUND

In a Long Term Evolution (LTE) system, a handover process of a User Equipment (UE) in a connected state is supported, that is, a UE presently using a network service is moved from a source cell to a target cell.

In the LTE system, the handover process of the UE can be a random access channel-less (RACH-less) handover (HO) for a specific scene. In the RACH-less handover process, the UE does not need to perform the random access procedure, and the target cell can configure (in a handover command) uplink resources for the UE to access the target cell, to able the UE to transmit a handover completion message. At present, the concept of beam is introduced in New Radio (NR). UE usually needs to perform a beam selection, and then perform resource selection on the beam, herein, the beam information can be obtained during a random access procedure.

However, for the RACH-less handover, because no random access procedure is performed, the beam information cannot be effectively determined, so how to configure resources for communication between UE and target network is a problem to be solved.

SUMMARY

The present disclosure relates to the field of communication, and particularly to a resource processing method and an apparatus.

Embodiments of the present disclosure provide a resource processing method and an apparatus, which can be used to solve the problem of resource configuration for communication between UE and target network during the RACH-less handover.

In a first aspect, the embodiments of the present disclosure provide a method for resource processing. The method includes the following operations.

First configuration information for indicating a terminal device to perform a first type of handover is received from a network device, the first configuration information includes resource configuration information for performing the first type of handover, and the resource configuration information includes an association relationship between at least one uplink resource and at least one beam.

A transmission resource is determined based on the resource configuration information, and the transmission resource is used for the terminal device to transmit uplink data.

In a second aspect, the embodiments of the present disclosure provide a method for resource processing. The method includes the following operation.

First configuration information is transmitted to a terminal device, the first configuration information is used for indicating the terminal device to perform a first type of handover, the first configuration information includes resource configuration information for performing the first type of handover, and the resource configuration information includes an association relationship between at least one uplink resource and at least one beam.

Uplink data which is transmitted by the terminal device based on a transmission resource is received, and the transmission resource is determined based on the resource configuration information.

In a third aspect, the embodiments of the present disclosure provide an apparatus for resource processing. The apparatus includes a transceiver and a processor.

The transceiver is configured to receive, from a network device, first configuration information for indicating a terminal device to perform a first type of handover, the first configuration information includes resource configuration information for performing the first type of handover, and the resource configuration information includes an association relationship between at least one uplink resource and at least one beam.

The processor is configured to determine a transmission resource based on the resource configuration information, and the transmission resource is used for the terminal device to transmit uplink data.

BRIEF DESCRIPTION OF THE DRAWINGS

FIG. 3 is a schematic diagram of a handover of a UE between different cells provided according to an embodiment of the present disclosure;

FIG. 4 is a flowchart of a 4-step RACH provided according to an embodiment of the present disclosure;

FIG. 5 is a flowchart of a 2-step RACH provided according to an embodiment of the present disclosure;

DETAILED DESCRIPTION

Figure 1:
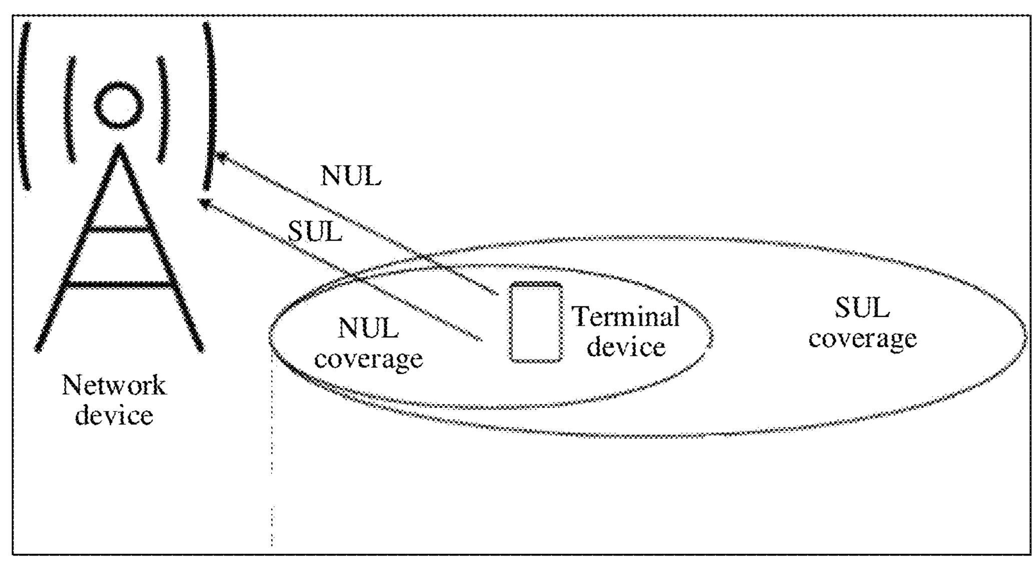
FIG. 1 is a schematic diagram of an uplink provided according to an embodiment of the present disclosure.

In order to better understand the technical solution of the present disclosure, related concepts and related technologies involved in the present disclosure are introduced below.

Terminal device: a device having wireless transceiver function and cooperating with a network device to provide communication services for users. Specifically, the terminal device may refer to as a User Equipment (UE), an access terminal, a user unit, a user station, a mobile radio station, a mobile station, a remote station, a remote terminal, a mobile device, a user terminal, a terminal, a wireless communication device, a user agent or a user apparatus. For example, the terminal device may be a cellular telephone, a cordless telephone, a Session Initiation Protocol (SIP) telephone, a Wireless Local Loop (WLL) station, a Personal Digital Processing (PDA) device, a handheld device having a wireless communication function, a computing device or other processing device connected to a wireless modem, an on-board equipment, a wearable device, a terminal device in a future 5G network or a network after 5G, and the like.

Network device: the network device may be a device for communicating with a terminal device, for example, a Base Transceiver Station (BTS) in a Global System for Mobile Communication (GSM) system or a Code Division Multiple Access (CDMA) communication system, a NodeB (NB) in a Wideband Code Division Multiple Access (WCDMA) system, or an Evolved Node B (eNB or eNodeB) in a LTE system. The network device may also be a relay station, an access point, an on-board device, a wearable device, a network side device in a future 5G network or a network after 5G, or a network device in a future evolved Public Land Mobile Network (PLMN) network, etc.

The network device referred to in embodiments of the present disclosure may also be referred to as a Radio Access Network (RAN) device. The RAN device is connected with a terminal device for receiving data of the terminal device and transmitting the data to a core network device. The RAN device corresponds to different devices in different communication systems, for example, corresponding to a base station and a base station controller in a 2G system, corresponding to a base station and a Radio Network Controllers (RNC) in a 3G system, an Evolved Node B (eNB) in a 4G system, and an access network device (such as a gNB, a centralized unit CU, a distributed unit DU) in a 5G system, such as a New Radio (NR), in a 5G system.

Beam: the embodiment of a beam in a NR protocol can be a spatial domain filter, or referred to as a spatial filter or spatial parameters. The beam used for transmitting a signal may be referred to as a transmission beam (Tx beam), which can be referred to as a spatial domain transmit filter or a spatial domain transmit parameter. The beam used for receiving the signal may be referred to as a reception beam (Rx beam), which can be referred to as a spatial domain receive filter or a spatial domain receive parameter.

For example, the beam may be understood as a spatial resource and may refer to a transmission or reception precoding vector with energy transmission directivity. Moreover, the transmission or reception precoding vector may be identified by index information, the index information may correspond to a resource identity (ID) configured to the terminal, for example, the index information may correspond to: an identity or a resource of a configured synchronization signal block (SSB), an identity or a resource of a configured channel state information reference signal (CSI-RS) or an identity or a resource of a configured uplink sounding reference signal (SRS). Alternatively, the index information may also be index information explicitly or implicitly carried by channels or signals carried through the beam. The energy transmission directivity may refer to that the signal to be transmitted is pre-coded through the precoding vector, the pre-coded signal has certain spatial directivity; and when receiving the signal pre-coded through the precoding vector, it will has better reception power, such as satisfying a reception demodulation signal-to-noise ratio. The energy transmission directivity may also refer to that same signals transmitted from different spatial locations received through the precoding vector have different reception powers. Alternatively, a same communication device (such as a terminal device or a network device) may have different precoding vectors, and different devices may also have different precoding vectors, i.e. corresponding to different beams. For the configuration or capability of a communication device, a communication device may use one or more of multiple different precoding vectors at a same time, i.e. one beam or multiple beams may be formed at the same time.

Based on different transmission directions, the beam may be classified into transmission beam and reception beam. The transmission beam may refer to a distribution of signal strength in different directions in space after the signal is transmitted through an antenna, and the reception beam may refer to a distribution of signal strength of the wireless signal in different directions in space received from the antenna.

It is to be understood that the embodiment of the beam in the NR protocol enumerated above is by way of example only and should not constitute any limit to the present disclosure. The present disclosure does not exclude the possibility of defining other terms in future protocols to express the same or similar meanings.

In addition, the beam may be a wide beam, or a narrow beam, or another type of beam. The technology for forming a beam may be a beamforming technology or other technologies. The beamforming technology may specifically be a digital beamforming technology, an analog beamforming technology or a hybrid digital/analog beamforming technology. Different beams may be considered as different resources. Same information or different information can be transmitted through different beams.

Optionally, multiple beams having same or similar communication characteristics are considered as one beam. One beam may include one or more antenna ports for transmission of data channels, control channels, sounding signals, and the like. One or more antenna ports forming a beam can also be regarded as an antenna port set.

NUL: UpLink (UL) refers to a physical channel in which signals are from a terminal device to a network device, and a normal UL is a Normal UpLink (NUL).

SUL: Supplementary UpLink (SUL) is a supplementary uplink, a frequency band used by the SUL is lower than a frequency band used by the NUL, and a coverage of the SUL is larger than that of the NUL, which can be understood for example in conjunction with FIG. 1, FIG. 1 is a schematic diagram of an uplink provided according to an embodiment of the present disclosure.

As shown in FIG. 1, both the NUL and the SUL are uplinks, the coverage of the SUL is larger than the coverage of the NUL, and the SUL has a lower frequency point, and a signal loss is smaller, thereby ensuring the coverage of the NUL.

Hereinafter a scenario to which the resource processing method in the present disclosure applies will be described with reference to FIG. 2.

Figure 2:
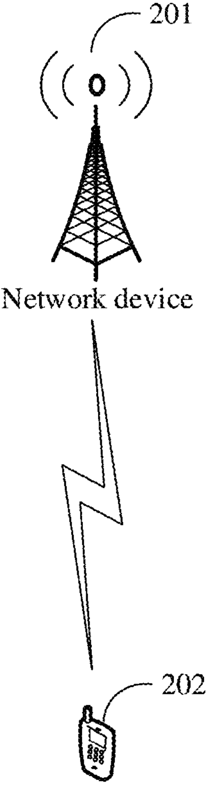
FIG. 2 is a schematic diagram of a communication scenario provided according to an embodiment of the present disclosure.

FIG. 2 is a schematic diagram of a communication scenario provided according to an embodiment of the present disclosure. Referring to FIG. 2, the communication scenario includes a network device 201 and a terminal device 202, a wireless communication between the network device 201 and the terminal device 202 can be performed, and the terminal device 202 may communicate with at least one core network via a Radio Access Network (RAN).

The communication system may be a Global System of Mobile communication (GSM) system, a Code Division Multiple Access (CDMA) system, a Wideband Code Division Multiple Access (WCDMA) system, a Long Term Evolution (LTE) system or a 5th Generation (5G) system.

Accordingly, the network device may be a Base Transceiver Station (BTS) in a GSM system or a CDMA system, a base station (NodeB, NB) in a WCDMA system, an evolved NodeB (eNB), an access point (AP) or a relay station in an LTE system, or a base station in a 5G system, etc., which are not limited herein.

The 5G mobile communication system disclosed herein includes a non-standalone (NSA) 5G mobile communication system and/or a standalone (SA) 5G mobile communication system. The technical solution provided according to the present disclosure may also be applied to future communication systems, such as a sixth generation mobile communication system. The communication system may also be a PLMN network, a Device-to-Device (D2D) network, a Machine to Machine (M2M) network, an IoT network or other networks.

It should be understood that if the technical solution of the embodiments in the present disclosure is applied to other wireless communication networks, the corresponding names may also be replaced by names of corresponding functions in other wireless communication networks.

The network architecture and service scenario described in the embodiments of the present disclosure are intended to more clearly explain the technical solution of the embodiments in the present disclosure and do not constitute a limit to the technical solution provided according to the embodiments of the present disclosure. It can be known for those of ordinary skill in the art that with the evolution of the network architecture and the appearance of new service scenarios, the technical solution provided according to the embodiments of the present disclosure is also applicable to similar technical problems.

On the basis of the above-described contents, a handover process of a cell handover is described below, the cell handover refers to that a channel handover is required to maintain uninterrupted communication for the UE when a UE moves from one cell to another cell in a wireless communication system. The cell refers to the base station or the coverage of the base station.

Similar to the LTE system, the NR system supports a handover process of a UE in a connected state, and the handover process of the UE in the connected state is performed under some conditions, for example, when the UE using a network service moves from one cell to another cell, or due to an adjustment of a wireless transmission service load, an activation operation maintenance, equipment fault and other reasons, in order to ensure a continuity of the communication and quality of the service, the system should transfer the communication link between the UE and the original cell to a new cell, that is, the handover process is performed.

For example, the handover process can be understood in conjunction with FIG. 3, FIG. 3 is a schematic diagram of a handover for a UE between different cells provided according to an embodiment of the present disclosure.

As shown in FIG. 3, the terminal device 301 is located in an area covered simultaneously by three different cells C1, C2 and C3. Assuming that the terminal device 301 is presently accessing the cell C1, the terminal device 301 may, for example, perform a handover from the cell C1 to the cell C2 or from the cell C1 to the cell C3 in case that the specific conditions described above are satisfied. The cell C1 is a source cell, i.e., a cell before the terminal device handover, and the cell C2 or the cell C3 is a target cell, i.e., a cell after the terminal device handover.

The handover process described above may be, for example, an intra-station handover, i.e., the source cell and the target cell belong to a same network device, and the source cell and the target cell may be a same cell or different cells. Alternatively, the handover process may be an inter-station handover, i.e., the source cell and the target cell belong to different network devices, which are not limited in the present disclosure.

On the basis of the contents related to a handover described above, the handover process is introduced by taking the handover process of a Xn interface as an example, the Xn interface refers to a network interface between Next Generation Radio Access Network (NG-RAN) nodes, and the NG-RAN node may include, for example, a 5G base station (gNB) and a 4G base station (ng-eNB) upgraded to support an eLTE.

The whole handover process may be divided into the following three stages:

(1) Handover preparation: including a measurement control and report, a handover request and acknowledgement. For example, a source base station can configure a measurement report of a UE, and the UE transmits the measurement report to the source base station based on a predetermined measurement rule. The source base station determines whether a handover for the UE is needed based on the measurement report and Radio Resource Management (RRM) information. In response to the handover being needed, the source base station transmits a handover request to the target base station. The target base station performs an admission control based on the received Quality of Service (QoS) information and returns a handover acknowledgement message.

The handover acknowledgement message contains a handover command generated by the target cell, and the source cell is not allowed to perform any modification to the handover command generated by the target cell, and directly forwards the handover command to the UE.

It should be understood that the source cell corresponds to a source network device (e.g., a source base station) and the target cell corresponds to a target network device (e.g., a target base station).

(2) Handover execution: The UE performs the handover process immediately after receiving the handover command, that is, the UE disconnects with the source cell and connects with the target cell (such as performing a random access, transmitting a Radio Resource Control (RRC) handover completion message to the target base station, etc. it may also include a SN state transition and a data forwarding).

(3) Handover completion: a Path Switch is performed between the target cell and an Access and Mobility Management Function (AMF) network element and a User Plane Function (UPF) network element, to release contexts of the UE in the source base station.

Based on the above introduction, it can be determined that in the handover process, the UE needs to transmit a handover completion message to the target cell, thus the UE needs to obtain corresponding uplink resources, so as to transmit the handover completion message to the target cell based on the uplink resources.

In a possible implementation, a traditional handover process usually includes a random access procedure, that is, after receiving the handover message, the terminal device performs the random access procedure with the target cell based on relevant information (such as a physical cell identity of the target cell, frequency information, random access resource information required for handover to the target cell, etc.) of the target cell contained in the handover message, and then transmits a handover completion message to the target cell.

The following is a brief description of the random access procedure. A random access is a process that the terminal device starts to transmit a random access preamble index to the network device which is tried to access, and a connection between the terminal device and the network device is established. The random access procedure may occur, for example, in a handover, an RRC re-establishment, etc.

The random access involved in the embodiments of the present disclosure may include a four-step random access (also referred to as a four-step random access channel or a 4-step RACH) and a two-step random access (also referred to as a two-step random access channel or a 2-step RACH), and for easy to understand, the processes of the 4-step RACH and the 2-step RACH are described in detail below, respectively.

The following is a brief description of the 4-step RACH according to FIG. 4. FIG. 4 is a flowchart of a 4-step RACH provided according to an embodiment of the present disclosure. As shown in FIG. 4, the 4-step RACH may specifically include the following operations.

At S401, a terminal device transmits an Msg1 to a network device.

The Msg1 is used to transmit a random access preamble, for example, the terminal device transmits the random access preamble (or the random access preamble sequence) index to the network device through a Physical Random Access Channel (PRACH).

At S402, the network device transmits an Msg2 to the terminal device.

The Msg2 may include a random access response. The random access response may include a timing advance (TA), an UpLink (UL) grant, a temporary cell-radio network temporary identifier (C-RNTI) of a response, and the like.

At S403, the terminal device transmits an Msg3 to the network device.

The Msg3 is a first scheduled transmission in the random access procedure, for example, the terminal device transmits messages/data on a UL grant resource allocated by the network device based on the received random access response, for example, transmitting an RRC establishment request message, which may contain identity information of the terminal device. The identity information may be, for example, a temporary C-RNTI as described above.

At S404, the network device transmits an Msg4 to the terminal device.

The Msg4 is used for indicating whether the terminal device successfully accesses the network device. For example, after the network device receives the message/data transmitted by the terminal device on the allocated UL grant resource, if there is no conflict (or no contention), the network device transmits a contention resolution message to the terminal device, for example, the network device transmits an RRC establishment message to the terminal device. Thereafter, the terminal device can communicate with the network device.

The following is a brief description of a two-step random access according to FIG. 5. FIG. 5 is a flowchart of a 2-step RACH provided according to an embodiment of the present disclosure. As shown in FIG. 5, the 2-step RACH may specifically include the following operations.

At S501, the terminal device transmits an MsgA to the network device.

The MsgA is used to transmit a random access preamble, for example, the terminal device transmits the random access preamble index (or the random access preamble sequence) to the network device through a PRACH. In a non-contention random access procedure, the random access preamble index is allocated in advance by the network device to the terminal device. In other words, the random access preamble index is dedicated.

At S502, the network device transmits an MsgB to the terminal device.

The MsgB is used for indicating whether the terminal device successfully accesses the network device. For example, the network device transmits a random access response to the terminal device. The random access response may include a TA, a UL grant, etc. of the response.

It should be noted that the UL grant may specifically include at least one of the following: a time-frequency resource, a Modulation and Coding Scheme (MCS), a New Data Indication (NDI), a time (such as a subframe or a slot) when an uplink transmission is initiated, or an interval of an uplink scheduling, and the like. The time-frequency resource contained in the UL grant may specifically refer to a time-frequency position of the uplink resource scheduled by the UL grant. The uplink resource scheduled by the UL grant may be, for example, a PUSCH resource.

Based on the contents of the random access procedure described above, it can be determined that the UE may obtain uplink resources by initiating the random access procedure, so as to transmit a handover completion message to the target cell, and may also obtain a TA by initiating the random access procedure, so as to implement a synchronization with the target cell.

In another possible implementation, in the LTE system, the handover process may also be a RACH-less HO for a specific scenario, that is, the terminal device may perform the handover process without performing the random access procedure with the target cell. The specific scenario presently introduced may be for example that the target cell may judge that a TA from the UE to the source cell is same as a TA from the UE to the target cell, or that the TA from the UE to the target cell is 0.

For example, the source cell and the target cell may have different coverage under a same network device, or the source cell and the target cell may be co-located. At this time, for a certain terminal device, it may be determined that the TA from the UE to the source cell and the TA from the UE to the target cell are same. Alternatively, the target cell may be a small cell. At this case, for a certain terminal device, it may be determined that the TA from the UE to the source cell is 0.

Based on the above introduction, it can be determined that the TA may be acquired during the random access procedure, but in the specific scenario described above, the terminal device may determine the TA without performing the random access procedure, thus in such specific scenario, the terminal device may perform a RACH-less HO. In the RACH-less HO process, the target cell may configure RACH-skip information in the handover command, and the RACH-skip information may contain a uplink resource for the UE to access the target cell, and the uplink resource is used for the UE to transmit a handover completion message.

Alternatively, if no uplink resource is configured in the handover command, the UE needs to monitor a PDCCH of the target cell, to wait for the target cell to schedule an uplink transmission, and then the UE transmits the handover completion message by using the scheduled uplink resource.

Based on the above introduction, the uplink resource in the RACH-less HO process are explained below.

Resources for the UE to transmit uplink data may be indicated based on a network dynamically scheduling (such as through Downlink Control Information (DCI)); or a group of periodic uplink resources based on preconfigured by the network, i.e., preconfigured Configured Grant (CG), herein, an uplink CG may be classified into two types: Type 1 and Type2.

The CG Type 1 is configured by a RRC parameter ConfiguredGrantConfig. The RRC parameter ConfiguredGrantConfig may include a time domain resource, a frequency domain resource, a Demodulation Reference Signal (DMRS), an open loop power control, a Modulation and Coding Scheme (MCS), a waveform, a redundant version, repetition times, a frequency modulation, a Hybrid Automatic Repeat reQuest (HARQ) process and other parameters. After receiving a high-level configuration, the UE may use the configured CG type 1 resource to perform a transmission for uplink data without additional activation operations.

The CG Type2 is also configured by RRC parameter ConfiguredGrantConfig, but does not contain information indicated in an rrc-ConfiguredUplinkGrant field in this parameter, the activation of configured CG Type2 resources is indicated by DCI scrambled by a Configured Scheduling Radio Network Temporary Identifier (CS-RNTI), and transmission resources including time domain resources, frequency domain resources, DMRS, MCS, etc. and transmission parameters are simultaneously configured. After receiving a high-level configuration, the UE cannot use CG Type2 resources, and must wait for receiving corresponding DCI activation instruction and configuration information, and then can perform an uplink data transmission.

It is worth noting that the rrc-ConfiguredUplinkGrant field in the ConfiguredGrantConfig is used to distinguish the Type 1 and the Type 2. If this field is configured, it means that present configuration is the CG Type 1, and otherwise present configuration is the CG Type 2.

The UE determines an HARQ process corresponding to a CG resource based on a network configuration, and starts a CG timer after the UE completes an uplink data transmission through the corresponding CG resource by using a certain HARQ. During a runtime of the CG timer, the UE cannot use a CG resource with a same HARQ process to perform a new data transmission, so as to avoid data in a HARQ buffer being overwritten by other data. When the CG timer expires, it is implicitly indicated that the data transmitted by the corresponding HARQ process has been correctly received by a network. In order to support a high latency requirement of an Ultra-reliable and Low Latency Communications (URLLC) service, the URLLC enhances a CG period and supports any slot-level service period.

The RACH-less handover process and the resource configuration in the RACH-less handover process are described above. In the LTE system, the above implementation can effectively indicate the implementation of resource configuration. However, a concept of beam is introduced in the NR, in the NR, the random access procedure is not only used to obtain the TA, but also used to determine the beam configuration information. For example, under normal conditions, the terminal device may first select a beam, and then implicitly inform the network device which beam is presently used for data transmission, and the network device may also use this beam to ensure a correct communication.

However, because there is no random access procedure in the RACH-less process, the UE and the network device actually do not interact with beam information used by each other, so it is possible to occur such a case that the UE transmits data on one beam, and the network device receives data on another beam, thereby causing a data transmission failure.

Therefore, in the NR, there is no effective configuration for beam information for the RACH-less process, thus there is no effective solution for how to configure resources for a communication between a UE and a target network.

With respect to the problem in the prior art, the disclosure proposes the following technical conception: when a resource is configured for a UE, related information of a beam is indicated in resource configuration information at the same time, so that when the UE performs the resource selection later, the UE can perform a related selection based on the beam, and a network device can also receive data on the related beam, thus a configuration of a transmission resource for the UE can be effectively implemented during a RACH-less handover process, and a data transmission can be correctly implemented based on the transmission resource.

Figure 6:
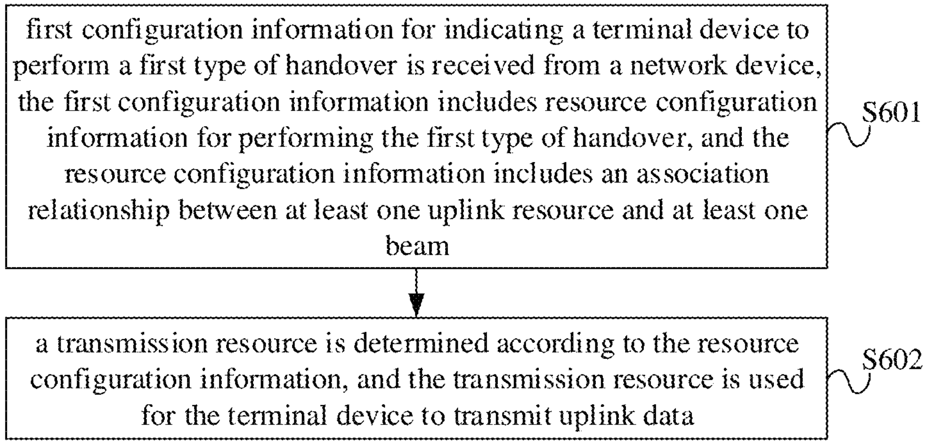
FIG. 6 is a flowchart of a method for resource processing provided according to an embodiment of the present disclosure.

The method for resource processing provided according to the present disclosure is described with reference to specific embodiments. FIG. 6 is a flow diagram of a method for resource processing provided according to an embodiment of the present disclosure.

As shown in FIG. 6, the method includes the following operations.

At S601, first configuration information for indicating a terminal device to perform a first type of handover is received from a network device, the first configuration information includes resource configuration information for performing the first type of handover, and the resource configuration information includes an association relationship between at least one uplink resource and at least one beam.

In the present embodiment, a terminal device can receive, from the network device, first configuration information for indicating the terminal device to perform a first type of handover. In a possible implementation, the first type of handover can be, for example, a RACH-less handover, i.e. a handover without a random access procedure as described above. The first configuration information can be, for example, an RRC message, such as an RRC reconfiguration message, etc. In an actual implementation process, the specific implementation of the first configuration information can be selected according to actual demands, as long as the first configuration information can be used for indicating the terminal device to perform the first type of handover.

The first configuration information in the embodiment may further include resource configuration information, the resource configuration information is resource configuration information for performing the first type of handover described above, and the resource configuration information in the embodiment may include an association relationship between at least one uplink resource and at least one beam.

It can be understood that uplink resources and beams in the resource configuration information are allocated to the UE for selecting, the at least one uplink resource is the resource which can be selected by the UE and used to transmit uplink data, and the at least one beam is also the beam which is allocated to the UE and can be selected by the UE.

The association relationship is for example relationships between the uplink resources and the beams, such as one beam corresponding to at least one uplink resource, or at least one uplink resource being shared by multiple beams. For example, an example may be given here. Assuming that there are beam 1 and beam 2 at present, and assuming that there are uplink resource A, uplink resource B and uplink resource C, for example, there may be the following association relationship: there is an association relationship between the beam 1 and the uplink resource A and the uplink resource B, and there is an association relationship between the beam 2 and the uplink resource C.

In an actual implementation process, the configuration of at least one uplink resource, the configuration of at least one beam, and the association relationship between at least one uplink resource and at least one beam can be selected according to actual demands, which are not limit in the embodiment.

At S602, a transmission resource is determined based on the resource configuration information, and the transmission resource is used for the terminal device to transmit uplink data.

After receiving the resource configuration information, the terminal device may determine the transmission resource based on the resource configuration information. It can be understood that the presently determined transmission resource may, for example, be a resource of the at least one uplink resource described above. After the transmission resource is determined, for example, the uplink data may be transmitted based on the determined transmission resource, and the transmitted uplink data may be, for example, the handover completion message described above, etc. The uplink data transmitted by the terminal device is also not limited in the embodiment as long as it is a data transmitted to the network device based on the presently determined transmission resource.

In the implementation of selecting the transmission resource based on the resource configuration information, for example, a selection can be performed for a beam. After a target beam satisfying a condition is determined, an uplink resource associated with the target beam can be selected based on an association relationship in the resource configuration information, so as to determine the transmission resource. By performing selection based on the association relationship, the selection for the beam can be effectively implemented in the implementation of the first type of handover, and then the data transmission is performed based on the resource on the selected beam, thereby ensuring that the terminal device and the network device can perform the data transmission based on the same beam, and the configuration of the transmission resource for the UE in the RACH-less handover process can be effectively implemented.

The method for resource processing provided according to the embodiment of the present disclosure includes the following operations. First configuration information for indicating a terminal device to perform a first type of handover is received from a network device, the first configuration information includes resource configuration information for performing the first type of handover, and the resource configuration information includes an association relationship between at least one uplink resource and at least one beam. A transmission resource is determined based on the resource configuration information, and the transmission resource is used for the terminal device to transmit uplink data. By indicating the association relationship between the uplink resources and the beams based on the first configuration information, the first configuration information indicates the terminal device to perform the first type of handover, and then the transmission resource is determined based on the first configuration information, so that during the handover process of the first type of handover, the determination of the transmission resource can be effectively implemented based on the selection and determination of beam information, thereby implementing the effective configuration of the resource for the communication between the UE and the target network.

On the basis of the above embodiments, it can be understood that the uplink resource in the present disclosure may be the CG resource described above, and may also be the dynamic scheduling resource described above. The related implementations for resource determinations corresponding to different uplink resources are respectively introduced below.

Firstly, the implementation of the uplink resource being the CG resource is introduced. Based on the above introduction, it can be determined that the CG resource may be a first type of CG resource (Type1 CG resource) or a second type of CG resource (Type2 CG resource). The Type1 CG resource and the Type2 CG resource are described respectively below.

Figure 7:
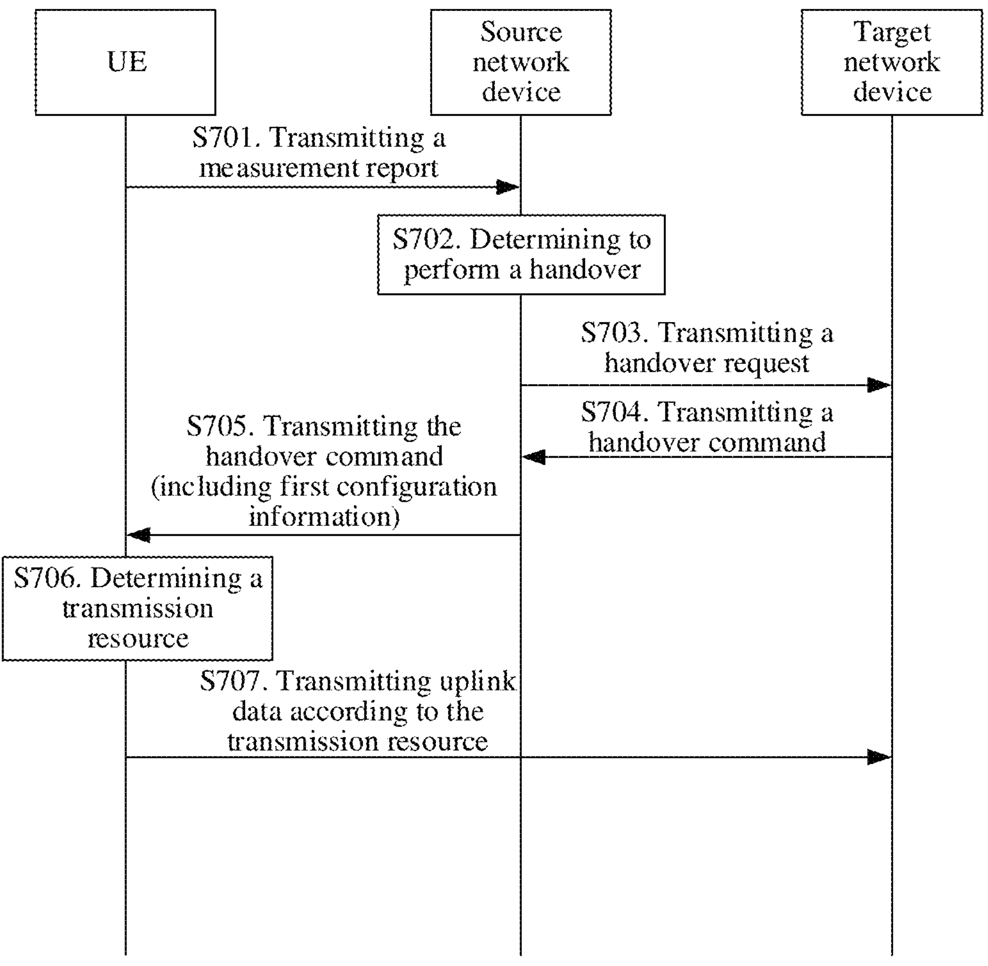
FIG. 7 is a first signaling flowchart of a method for resource processing provided according to an embodiment of the present disclosure.

Firstly, the related implementation of resource configuration with respect to the Type1 CG resource is introduced with reference to FIG. 7, and FIG. 7 is a first signaling flowchart of a method for resource processing provided according to an embodiment of the present disclosure.

As shown in FIG. 7, the method includes the following operations.

At S701, a UE transmits a measurement report to a source network device.

The UE may, for example, perform a measurement process based on measurement configuration information configured by the source cell and transmit the measurement report to the source network device.

At S702, the source network device determines to perform a handover.

The source cell may determine to perform the handover process based on, for example, the measurement report of the UE and RRM information.

At S703, the source network device transmits a handover request to the target network device.

After the source network device determines to perform the handover, the source cell and the target cell may make preparation for the handover, for example, the handover request may be transmitted to the target device.

At S704, the target network device transmits a handover command to the source network device.

The target network device can transmit the handover command to the source network device based on the handover request transmitted by the source network device.

At S705, the source network device transmits the handover command to the UE.

After receiving the handover command from the target network device, the source network device may forward the handover command to the terminal device, and the handover command in this embodiment may be, for example, an RRC reconfiguration message.

In a possible implementation, taking the source network device as a source gNB and the target network device as a target gNB as an example, the specific implementation of S701-S705 in this embodiment are further introduced in detail:

0. The UE context within the source gNB contains information regarding roaming and access restrictions which were provided either at the connection establishment or at the last TA update.

(The UE context within the source gNB contains information regarding roaming and access restrictions which were provided either at connection establishment or at the last TA update.)

1. The source gNB configures the UE measurement process and the UE reports based on the measurement configuration.

(The source gNB configures the UE measurement procedures and the UE reports based on the measurement configuration.)

2. The source gNB determines to perform a handover for the UE based on the measurement report and RRM information.

(The source gNB decides to handover the UE, based on Measurement Report and RRM information.)

3. The source gNB transmits a handover request message to the target gNB, and the handover request message is used for passing a transparent RRC container with necessary information to prepare the handover at the target side. The necessary information includes at least a target cell ID, a KgNB*, a C-RNTI of the UE in the source gNB, a RRM configuration including UE inactive time, a basic AS configuration including antenna information and a DL carrier frequency, a mapping rule between a present QoS flow and a DRB applied to the UE, a SIB1 from the source gNB, UE capabilities for different RATs, PDU session related information, and may include measurement information (including beam-related information if available) reported by the UE. The PDU session related information includes slice information and a QoS profile in a QoS flow level. The source gNB may also request a DAPS handover for one or more DRBs.

(The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the present QoS flow to DRB mapping rules applied to the UE, the SIB1 from source gNB, the UE capabilities for different RATs, PDU session related information, and may include the UE reported measurement information including beam-related information if available. The PDU session related information includes the slice information and QoS flow level QoS profile(s). The source gNB may also request a DAPS handover for one or more DRBs.)

4. An admission control may be performed by the target gNB. A slice-aware admission control shall be performed if the slice information is transmitted to the target gNB. If a PDU session is associated with non-supported slices, the target gNB shall reject such PDU session.

(Admission Control may be performed by the target gNB. Slice-aware admission control shall be performed if the slice information is sent to the target gNB. If the PDU sessions are associated with non-supported slices the target gNB shall reject such PDU Sessions.)

5. The target gNB prepares a handover with L1/L2 and transmits a handover request acknowledge to the source gNB, the handover request acknowledge includes a transparent container to be transmitted to the UE as an RRC message to perform the handover. The target gNB also indicates whether a DAPS handover is accepted.

(The target gNB prepares the handover with L1/L2 and sends the HANDOVER REQUEST ACKNOWLEDGE to the source gNB, which includes a transparent container to be sent to the UE as an RRC message to perform the handover. The target gNB also indicates if a DAPS handover is accepted.)

6. The source gNB triggers a Uu handover by transmitting a handover command (RRCReconfiguration) message to the UE, the handover command message includes information required to access the target cell: at least a target cell ID, a new C-RNTI, a target gNB security algorithm identifier for a selected security algorithm and may also include a set of dedicated RACH resources, an association relationship between RACH resources and SSBs, an association relationship between RACH resources and a UE-specific CSI-RS/SSB configurations, common RACH resources and system information of the target cell, etc.

(The source gNB triggers the Uu handover by sending an RRCReconfiguration message to the UE, containing the information required to access the target cell: at least the target cell ID, the new C-RNTI, the target gNB security algorithm identifiers for the selected security algorithms. It may also include a set of dedicated RACH resources, the association between RACH resources and SSB(s), the association between RACH resources and UE-specific CSI-RS/SSB configuration(s), common RACH resources, and system information of the target cell, etc.)

In the present embodiment, the RRC reconfiguration message (RRCReconfiguration) described above may, for example, be a handover command, and the handover command in the present embodiment may include the first configuration information described above, or it can be understood that the presently described handover command is the first configuration information described above.

In a possible implementation, the handover command may include, for example, TA indication information, such as RACH-skip information described above, so that the handover command can indicate that the handover process is a RACH-less handover process, i.e., the first configuration information described above can indicate the terminal device to perform a first type of handover. Meanwhile, the first configuration information includes resource configuration information for performing the first type of handover. The resource configuration information in this embodiment is configuration information for the Type 2 CG resource, and the implementation of the resource configuration information will be described below.

The resource configuration information may include at least one of: carrier information, an association relationship between at least one uplink resource and at least one beam, a first threshold corresponding to beam quality, a time domain resource, a frequency domain resource, a demodulation reference signal, an open-loop power control, a modulation and coding scheme, a waveform, a redundant version, repetition times, a frequency modulation, an HARQ process and other parameters. In an actual implementation process, the contents included in the resource configuration information may also be selected and expanded according to actual demands, which is not limited in the embodiment, as long as the parameters included in the resource configuration information are used for indicating the resources.

At S706, the transmission resource is determined.

After receiving the first configuration information, the terminal device can determine the transmission resource based on the first configuration information. When determining the transmission resource based on the resource configuration information presently introduced, for example, the UE can perform the transmission resource selection based on at least one of the following operations.

Optionally, the terminal device may, for example, determine a first Bandwidth Part (BWP), the first BWP is any one of: an initial BWP, a BWP configured with the CG resource, or a BWP indicated by a first parameter, the first parameter is configured by a network or specified by a protocol. In this embodiment, the first parameter may, for example, be a FirstActiveUplinkBWP. In an actual implementation process, the specific implementation of the first parameter can be selected according to actual demands, which is not limited in the embodiment, as long as the first parameter is configured by a network or specified by a protocol for indicating a BWP.

Optionally, the terminal device may also, for example, determine at least one first CG resource based on carrier information on the basis of the selected first BWP, and the first CG resource in this embodiment is a resource on the first BWP.

In the following, several possible implementations of the carrier information are introduced respectively, and the implementations of determining the first CG resource under various implementations of carrier information are introduced.

In a possible implementation, the carrier information may include first indication information, the first indication information may indicate the terminal device to use a NUL, and a CG resource is configured on the NUL. When determining the first CG resource based on the carrier information, for example, the CG resource configured on the NUL indicated by the first indication information may be determined as the first CG resource.

Alternatively, the first indication information included in the carrier information may indicate the terminal device to use a SUL, and a CG resource is configured on the SUL. When determining the first CG resource based on the carrier information, for example, the CG resource configured on the SUL indicated by the first indication information may be determined as the first CG resource.

That is to say, in the present implementation, the target network device may, for example, directly indicate in the carrier information whether the SUL or the NUL is presently used based on the UE measurement result, and then determine the CG resource configured on the indicated SUL or NUL is the first CG resource.

In another possible implementation, the carrier information may include a CG resource configured on the NUL, a CG resource configured on the SUL, and a second threshold, and the second threshold in the present embodiment is used to compare with corresponding parameters to determine whether the SUL or the NUL is adopted by the present terminal device.

For example, the cell quality information may be compared with a second threshold, and when it is determined that the cell quality information is less than the second threshold, the CG resource configured on the SUL is determined as the first CG resource. Alternatively, when it is determined that the cell quality information is greater than or equal to the second threshold, the CG resource configured on the NUL is determined as the first CG resource. The cell quality information may include at least one of: a Reference Signal Receiving Power (RSRP) for a downlink path loss reference and a Reference Signal Receiving Quality (RSRQ) for the downlink path loss reference.

That is to say, in the present implementation, the target network device does not directly indicate whether the SUL or the NUL is presently used, but by configuring a second threshold, the terminal device may compare the cell quality information with the second threshold to determine whether the SUL or the NUL is presently used, and further determine the CG resource configured thereon as the first CG resource.

In another possible implementation, the carrier information is determined by a carrier configured with a CG resource, that is to say, a uplink carrier configured with the CG resource is determined as a target carrier, and the CG resource corresponding to the target carrier is further determined as the first CG resource.

For example, a CG resource is only configured on a NUL, and the CG resource configured on the NUL is determined as the first CG resource.

Alternatively, for example, the network only configures a CG resource on a SUL, and then the CG resource configured on the SUL can be determined as the first CG resource.

That is to say, in the present implementation, the target network device does not directly indicate whether the SUL or the NUL is presently used, and does not configure the second threshold. The terminal device determines which of the SUL or the NUL is configured with the CG resource, and the terminal device selects an uplink carrier configured with the CG resource, thereby determining the first CG resource.

In an actual implementation process, the specific implementation of the carrier information and the specific implementation of determining the first CG resource based on the carrier information may be selected according to actual demands, which are not limited in the embodiment.

The above described is implementations for determining at least one first CG resource. Alternatively, on the basis of the determined at least one first CG resource, in case that a transmission resource is determined, a second CG resource can be determined from the at least one first CG resource based on the association relationship in the resource configuration information and the first threshold.

In a possible implementation, a beam is selected from the at least one beam when beam quality information of the at least one beam is higher than the configured first threshold.

The beam in this embodiment may be any one of a Synchronization Signal and physical broadcast channel block (SSB), a Channel State Information Reference Signal (CSI-RS), a Sounding Reference Signal (SRS), a Transmission Configuration Indication (TCI) state and a spatial relation. The beam quality information includes a synchronization signal reference signal reception power (SS-RSRP) and/or a channel state information reference signal reception power (CSI-RSRP).

The implementation for selecting the beam, in combination with the specific beam quality information, may be understood as: when the SS-RSRP of at least one SSB is higher than the configured first threshold (rsrp-ThresholdSSB), one SSB is selected from the at least one SSB, or when the CSI-RSRP of at least one CSI-RS is higher than the configured first threshold (rsrp-ThresholdCSI-RS), one CSI-RS is selected from the at least one CSI-RS.

It can be understood that in the present embodiment, there may be one or more beams with beam quality information greater than the first threshold, so that at least one candidate beam can presently be determined, and thus after determining the candidate beam(s), a further selection can be performed among the at least one candidate beam, thereby determining the target beam.

In a possible implementation, the target beam may, for example, be a beam with strongest beam channel quality among the candidate beam(s), or the target beam may be a beam randomly selected from the candidate beam(s), or the target beam may be a beam with a largest or smallest index value among the candidate beam(s), etc. The specific implementation of selecting the target beam from the candidate beam(s) is not limited in the embodiment, as long as the target beam is selected from the candidate beam(s).

After determining the target beam, optionally, the second CG resource can be determined based on the association relationship in the resource configuration information, for example, at least one first CG resource corresponding to the target beam in the association relationship can be determined as the second CG resource.

Based on the above introduction, it can be determined that in the association relationship, one beam may correspond to at least one CG resource, multiple beams may share at least one CG resource, so second CG resource corresponding to the target beam in the determined association relationship in this embodiment may also be one or more.

Therefore, optionally, the transmission resource may be further determined from the second CG resource. In a possible implementation, a second CG resource with time domain position closest to the present time among second CG resources may be determined as the transmission resource, and the present time is a time when the terminal device is presently determining the transmission resource. Alternatively, a second CG resource randomly selected from second CG resources may be determined as the transmission resource. In an actual implementation process, the implementation of determining the transmission resource from second CG resources may be selected according to actual demands, which is not limited in this embodiment.

For example, in the content described above in conjunction with specific beam quality information, after obtaining a target beam SSB or a target beam CSI-RS, a transmission resource is selected among CG resources associated with the SSB or the CSI-RS according to the implementations described above, so that an uplink transmission can be performed based on the transmission resource.

However, it should also be noted herein that, when introducing the determination of candidate beams, the beam quality information is compared with the first threshold to determine at least one beam with beam quality information greater than the first threshold as candidate beam(s). In another possible implementation, there may not be a beam greater than the first threshold at present, for example, in the examples described above, there is no SSB/CSI-RS satisfying the threshold at present, then any one of the following operations may be performed:

- any beam configured with a CG resource is determined as the target beam, and the CG resource corresponding to the target beam is determined as the transmission resource;
- a random access procedure is initiated to a target cell; or
- a connection re-establishment process is initiated to a target cell or a source cell.

As described above, various possible implementations for determining the transmission resource are introduced. In the actual implementation process, the implementation for determining the transmission resource may be selected according to actual demands, which is not limited in this embodiment.

At S707, uplink data is transmitted based on the transmission resource.

After determining the transmission resource, the terminal device can transmit the uplink data to the target cell based on the transmission resource, the uplink data may include, for example, a RRC reconfiguration completion message, uplink data, a C-RNTI, a BSR, a MAC CE, etc. The specific implementation of the uplink data transmitted by the terminal device is not limited in the embodiment, which may be selected according to actual demands.

According to the method for resource processing provided according to the embodiment of the present disclosure, by configuring the Type1 CG resources in the handover command, and the Type1 CG resources associating with the beams, the resource configuration of the Type1 CG resource for communication between the UE and the target network during the RACH-less handover can be effectively implemented, thereby effectively implementing the determination of the transmission resource, to ensure that the UE and the network device can perform a correct data transmission.

Figure 8:
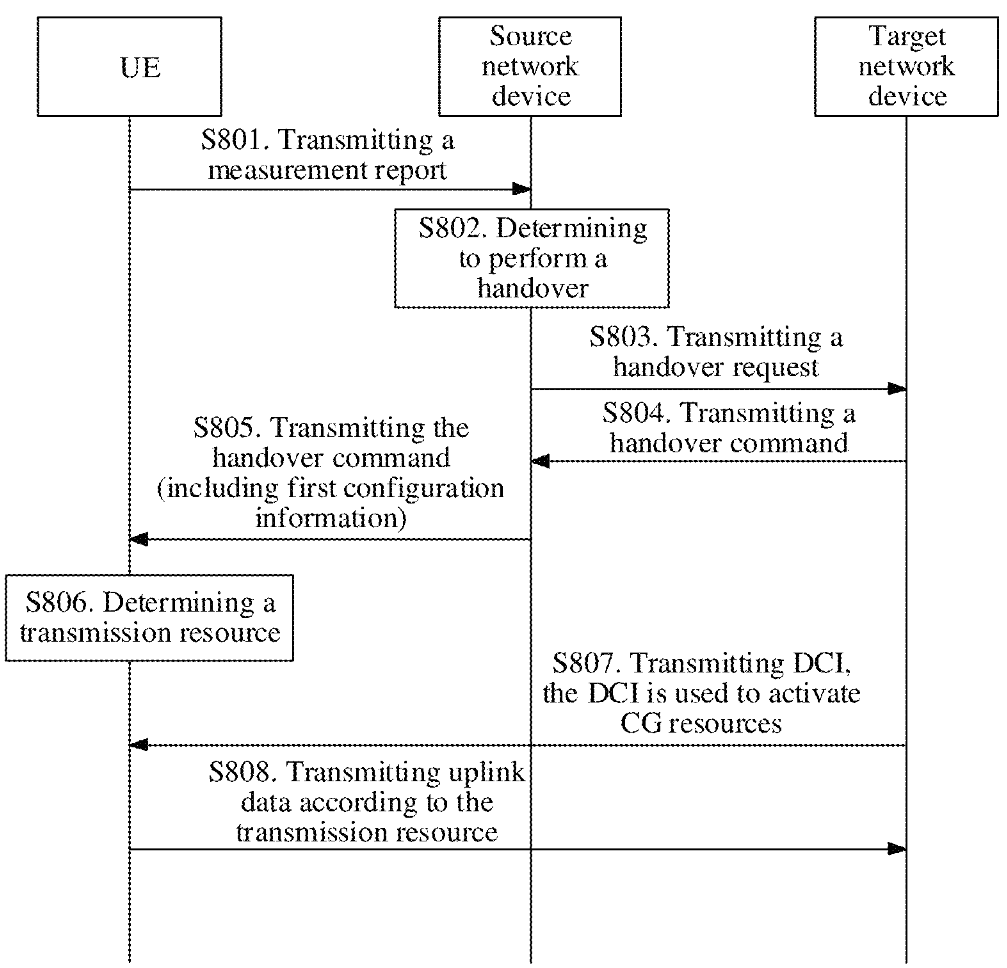
FIG. 8 is a second signaling flowchart of a method for resource processing provided according to an embodiment of the present disclosure.

The above-described implementations of the resource configuration of the Type1 CG resource are described, and the implementations of the resource configuration of the Type2 CG resource is described below with reference to FIG. 8, and FIG. 8 is a second signaling flowchart of a method for resource processing provided according to an embodiment of the present disclosure.

As shown in FIG. 8, the method includes the following operations.

At S801, a UE transmits a measurement report to a source network device.

At S802, the source network device determines to perform a handover.

At S803, the source network device transmits a handover request to the target network device.

At S804, the target network device transmits a handover command to the source network device.

At S805, the source network device transmits the handover command to the UE.

The implementation of S801-S805 is similar to that of S701-S705 introduced above, and will not be repeated herein.

On the basis of the above-described contents, there are some differences between the implementation of the handover command in the present embodiment and the above-described embodiment. The contents of the handover command in the present embodiment are described herein. In a possible implementation, the handover command may, for example, include TA indication information, such as RACH-skip information described above, thus the handover command may indicate that the handover process is a RACH-less handover process, that is, the first configuration information described above may indicate the terminal device to perform a first type of handover. Meanwhile, the first configuration information includes resource configuration information for performing the first type of handover. The resource configuration information in this embodiment is configuration information for the Type 2 CG resource, and the implementation of the resource configuration information will be described below.

The resource configuration information may include at least one of: carrier information, an association relationship between at least one uplink resource and at least one beam, a first threshold corresponding to beam quality, a time domain resource, a frequency domain resource, a demodulation reference signal, an open-loop power control, a modulation and coding scheme, a waveform, a redundant version, repetition times, a frequency modulation, an HARQ process and other parameters. In an actual implementation process, the contents included in the resource configuration information may also be selected and expanded according to actual demands, which is not limited in the embodiment, as long as the parameters included in the resource configuration information are used for indicating the resources.

At S806, the transmission resource is determined.

The terminal device can perform a corresponding selection for the resources based on the resource configuration information, so as to determine the transmission resource. When the CG resource is a Type2 CG resource, the implementation for determining the transmission resource is similar to the implementation method for determining the CG resource when the CG resource is a Type1 CG resource described in S706 above, and will not be repeated herein.

At S807, the target network device transmits DCI to the UE.

Based on the above introduction, it can be determined that for the Type2 CG resource, after performing a configuration, corresponding DCI activation instructions are needed to activate CG resources before they can be used. Therefore, in this embodiment, although the terminal device determines the transmission resource, the transmission resource has not been activated at present, so they are unavailable.

In this embodiment, the terminal device may for example receive from the network device a second message for activating the Type 2 CG resource.

In a possible implementation, the second message received by the terminal device may be, for example, a DCI transmitted by the target network device described in the present embodiment, for example, a UE can receive DCI transmitted by a target cell, and the DCI can be used to activate the Type2 CG resource configured in the handover command, or the second message may be an RRC message, a MAC CE, etc. The specific implementation of the second message is not limited in the embodiment, as long as the second message can indicate the activation of the Type2 CG resource.

In an optional implementation, when the CG resource is the Type2 CG resource, the handover command may also include beam information for the UE to receive the DCI from the target network device.

At S808, uplink data is transmitted based on the transmission resource.

After receiving the DCI from the target network device, the activation for the CG resource can be performed, the transmission resource has been determined above, then the uplink data can be transmitted based on the transmission resource. The uplink data may include, for example, a RRC reconfiguration completion message, uplink data, a C-RNTI, a BSR, a MAC CE, etc. The specific implementation of the uplink data transmitted by the terminal device is not limited in the embodiment, which may be selected according to actual demands.

According to the method for resource processing provided according to the embodiment of the present disclosure, by configuring the Type2 CG resources in the handover command, and the Type2 CG resources associating with the beams, the resource configuration of the Type2 CG resource for communication between the UE and the target network during the RACH-less handover can be effectively implemented, thereby effectively implementing the determination of the transmission resource, to ensure that the UE and the network device can perform a correct data transmission.

The above introduction is an implementation for resource configuration and resource selection with respect to the Type2 CG resource. In the above implementation, the DCI received by the terminal device will activate all CG resources, and then transmit uplink data based on the transmission resource determined by the UE. However, in another possible implementation, the UE may not perform the selection of the BWP, the NUL/SUL and the beam, but rather may determine the CG resource based on a DCI indication, this implementation will be described below in conjunction with FIG. 9.

Figure 9:
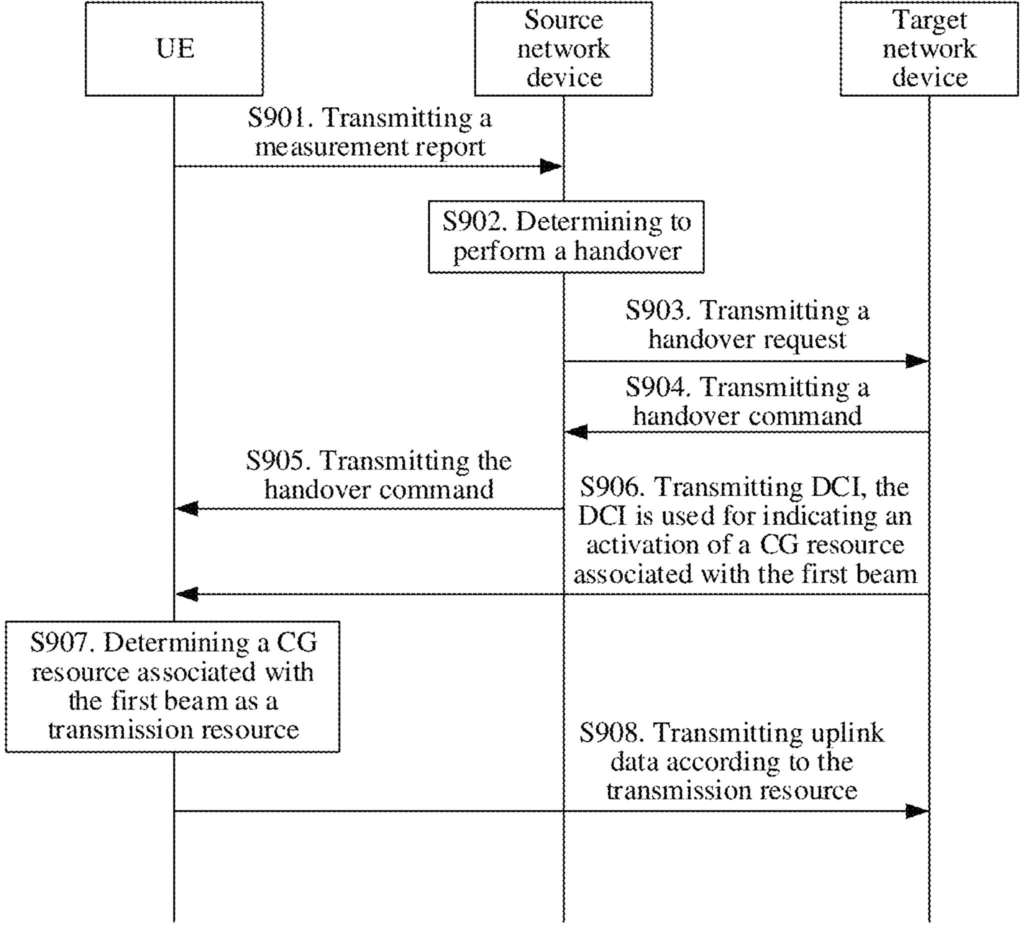
FIG. 9 is a third signaling flowchart of a method for resource processing provided according to an embodiment of the present disclosure.

FIG. 9 is a third signaling flowchart of a method for resource processing provided according to an embodiment of the present disclosure.

As shown in FIG. 9, the method includes the following operations.

At S901, a UE transmits a measurement report to a source network device.

At S902, the source network device determines to perform a handover.

At S903, the source network device transmits a handover request to the target network device.

At S904, the target network device transmits a handover command to the source network device.

At S905, the source network device transmits the handover command to the UE.

The implementation of S901-S905 is similar to that of S801-S805 introduced above, and will not be repeated herein.

At S906, the target network device transmits DCI to the UE, and the DCI is used for indicating an activation of a CG resource associated with the first beam.

In this embodiment, the DCI does not activate all Type2 CG resources, but specifically activates a CG resource associated with a first beam, the first beam is a beam configured by the network device for the terminal device to use. In this case, the DCI may also include, for example, a BWP indication; and the DCI may also include, for example, a NUL/SUL indication, that is, to indicate which of the NUL or the SUL is used by the terminal device at present. Therefore, in the present implementation, the terminal device does not need to perform the selection of the BWP, the NUL/SUL and the beam, and the CG resource can be determined based on the DCI indication.

At S907, the CG resource associated with the first beam is determined as the transmission resource.

In this embodiment, the DCI directly indicates the first beam, so the terminal device does not need to perform the selection process described in the above embodiment, thus the CG resource associated with the first beam can be directly determined as the transmission resource.

At S908, uplink data is transmitted based on the transmission resource.

After determining the transmission resource, the uplink data can be transmitted based on the transmission resource. The uplink data may include, for example, a RRC reconfiguration completion message, uplink data, a C-RNTI, a BSR, a MAC CE, etc. The specific implementation of the uplink data transmitted by the terminal device is not limited in the embodiment, which may be selected according to actual demands.

The method for resource processing provided according to the embodiment of the present disclosure can directly indicate the CG resource presently used by the terminal device by indicating the first beam, the NUL/SUL and the BWP in the DCI, so that the terminal device does not need to perform a series of selection processes, thereby simply and effectively implementing the configuration and selection of the Type 2 CG resource. The Type2 CG resource is associated with the beam, thus the resource configuration of the Type2 CG resource for communication between the UE and the target network during the RACH-less handover can be effectively implemented, thereby effectively implementing the determination of the transmission resource, to ensure that the UE and the network device can perform a correct data transmission.

In the above-mentioned embodiment, the implementation of the uplink resource being a CG resource is introduced. Based on the above-mentioned introduction, it can be determined that the uplink resource in the present disclosure may also be a dynamic resource, the related implementation of the resource configuration in case that the uplink resource is a dynamic configuration resource will be introduced below in conjunction with FIG. 10, and FIG. 10 is a fourth signaling flowchart of a method for resource processing provided according to an embodiment of the present disclosure.

Figure 10:
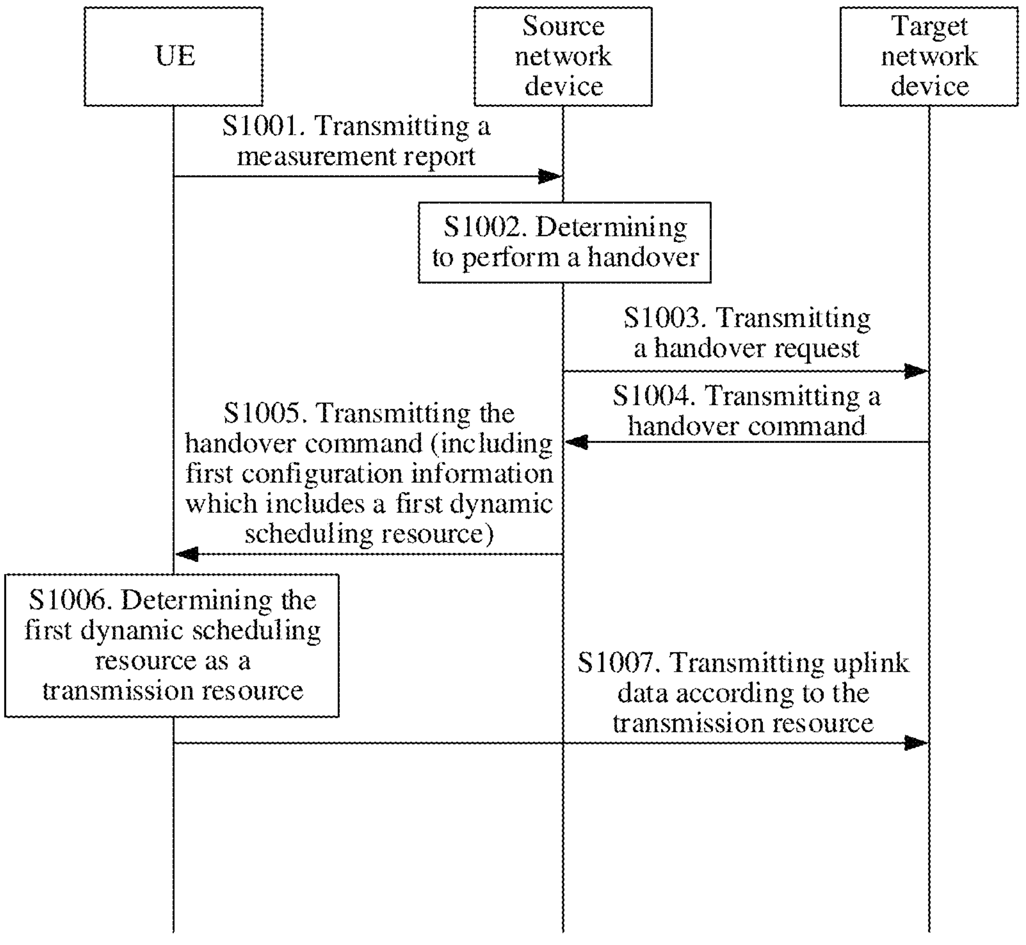
FIG. 10 is a fourth signaling flowchart of a method for resource processing provided according to an embodiment of the present disclosure.

As shown in FIG. 10, the method includes the following operations.

At S1001, a UE transmits a measurement report to a source network device.

At S1002, the source network device determines to perform a handover.

At S1003, the source network device transmits a handover request to the target network device.

At S1004, the target network device transmits a handover command to the source network device.

At S1005, the source network device transmits the handover command to the UE.

The implementation of S1001-S1005 is similar to that of S701-S705 introduced above, and will not be repeated herein.

On the basis of the above-described contents, there are some differences between the implementation of the handover command in the present embodiment and the above-described embodiment. The contents of the handover command in the present embodiment are described herein. In a possible implementation, the handover command may, for example, include TA indication information, such as RACH-skip information described above, so the handover command may indicate that the handover process is a RACH-less handover process, that is, the first configuration information described above may indicate the terminal device to perform a first type of handover. Meanwhile, the first configuration information includes resource configuration information for performing the first type of handover. The resource configuration information in this embodiment is configuration information for a dynamic scheduling resource, and the implementation of the resource configuration information will be described below.

In this embodiment, the handover command includes first configuration information, the first configuration information may include resource configuration information, and the resource configuration information may, for example, include at least one of: a time-frequency position of a first dynamic scheduling resource, a redundant version of the first dynamic scheduling resource, repetition times of the first dynamic scheduling resource, a frequency modulation of the first dynamic scheduling resource, or an HARQ process of the first dynamic scheduling resource.

That is to say, the resource configuration information in this embodiment directly indicates the first dynamic scheduling resource, and the resource configuration information also includes related beam information of the first dynamic scheduling resource.

At S1006, the first dynamic scheduling resource is determined as the transmission resource.

In this embodiment, the first dynamic scheduling resource is directly indicated in the resource configuration information, so the first dynamic scheduling resource can be directly determined as the transmission resource. In the association relationship described above, at least one beam associated with the first scheduling dynamic resource is included.

At S1007, uplink data is transmitted based on the transmission resource.

After determining the transmission resource, the uplink data can be transmitted based on the transmission resource. The uplink data may include, for example, a RRC reconfiguration completion message, optionally, may also include uplink data, a C-RNTI, a BSR, a MAC CE, etc. The specific implementation of the uplink data transmitted by the terminal device is not limited in the embodiment, and may be selected according to actual demands.

In the method for resource processing provided according to the embodiment of the present disclosure, by configuring a first dynamic scheduling resource in the handover command, and associating the first dynamic scheduling resource with the beam, the resource configuration of the dynamic scheduling resource for communication between the UE and the target network during the RACH-less handover can be effectively implemented, thereby effectively implementing the determination of the transmission resource, to ensure that the UE and the network device can perform a correct data transmission.

Optionally, with respect to the dynamic scheduling resource, in another possible implementation, the resource configuration information may also include the first beam information for indicating a first beam used for monitoring a third message, and the third message is used for indicating a second dynamic scheduling resource and at least one beam associated with the second dynamic scheduling resource.

The UE may, for example, monitor the third message on the first beam based on the first beam information; and after monitoring the third message, the UE may determine a second dynamic scheduling resource based on an indication of the third message. The presently determined second dynamic scheduling resource is a resource for performing an uplink data transmission. It can be understood that the present third message is different from the first configuration information, thus in the present embodiment, the dynamic scheduling resource can be indicated by a separate third message.

With respect to the dynamic resource scheduling, the described in the above-mentioned embodiments are that the resource configuration information is included in the first configuration information, and then the corresponding transmission resource is determined based on the relevant resource configuration information. In another possible implementation, the resource configuration information is not included in the first configuration information, and the first configuration information is only used for indicating the terminal device to perform the first type of handover. In such an implementation, the dynamic scheduling resource can be indicated according to the DCI. Such implementation will be described below with reference to FIG. 11.

Figure 11:
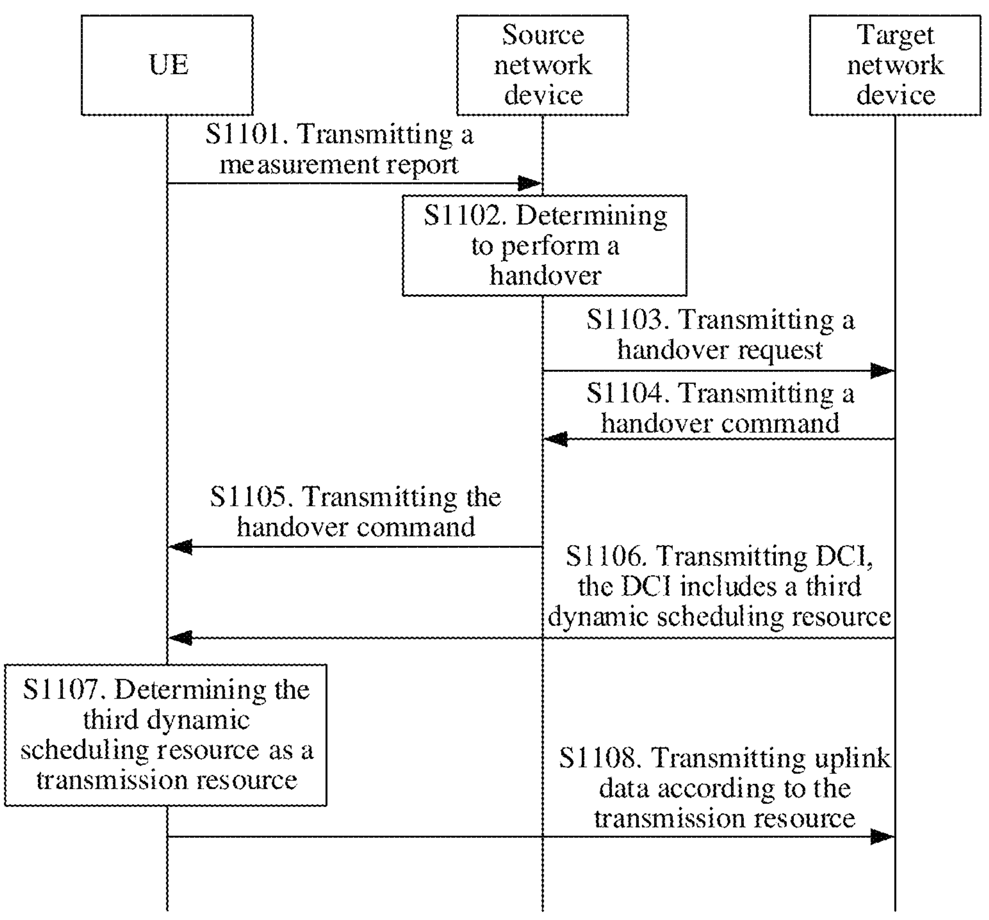
FIG. 11 is a fifth signaling flowchart of a method for resource processing provided according to an embodiment of the present disclosure.

FIG. 11 is a fifth signaling flowchart of a method for resource processing provided according to an embodiment of the present disclosure.

As shown in FIG. 11, the method includes the following operations.

At S1101, a UE transmits a measurement report to a source network device.

At S1102, the source network device determines to perform a handover.

At S1103, the source network device transmits a handover request to the target network device.

At S1104, the target network device transmits a handover command to the source network device.

At S1105, the source network device transmits the handover command to the UE.

The implementation of S1101-S1105 is similar to that of S701-S705 introduced above, and will not be repeated herein.

On the basis of the above-described contents, there are some differences between the implementation of the handover command in the present embodiment and the above-described embodiment. The contents of the handover command in the present embodiment are described herein. The handover command in this embodiment may, for example, include TA indication information, such as RACH-skip information described above, so the handover command may indicate that the handover process is a RACH-less handover process, that is, the first configuration information described above may indicate the terminal device to perform a first type of handover.

In the present embodiment, the first configuration information only indicates the terminal device to perform the first type of handover and does not indicate the resource configuration information.

At S1106, the target network device transmits DCI to the UE, and the DCI includes a third dynamic scheduling resource.

In this embodiment, the terminal device can monitor the DCI of the target cell, thereby receiving the dynamic scheduling resource which is transmitted from the target cell to the terminal device.

In a possible implementation, the dynamic scheduling resources in the embodiment may include: beam information, a time domain resource, a frequency domain resource, a demodulation reference signal, an open-loop power control, a modulation and coding scheme, a waveform, a redundant version, repetition times, a frequency modulation, an HARQ process and other parameters.

At S1107, the third dynamic scheduling resource is determined as the transmission resource.

In this embodiment, the third dynamic scheduling resource is directly indicated in the DCI, so the third dynamic scheduling resource can be directly determined as the transmission resource.

At the same time, the beam information of the third dynamic scheduling resource is also indicated in the DCI in the embodiment, so the determination of the beam information can also be effectively implemented, At S1108, uplink data is transmitted based on the transmission resource.

After determining the transmission resource, the uplink data can be transmitted based on the transmission resource. The uplink data may include, for example, a RRC reconfiguration completion message, optionally, may also include uplink data, a C-RNTI, a BSR, a MAC CE, etc. The specific implementation of the uplink data transmitted by the terminal device is not limited in the embodiment, and may be selected according to actual demands.

In the method for resource processing provided according to the embodiment of the present disclosure, by configuring a third dynamic scheduling resource and the beam information associated with the third dynamic scheduling resource in the DCI, the resource configuration of the dynamic scheduling resource for communication between the UE and the target network during the RACH-less handover can be effectively implemented based on DCI, thereby effectively implementing the determination of the transmission resource, to ensure that the UE and the network device can perform a correct data transmission.

Figure 12:
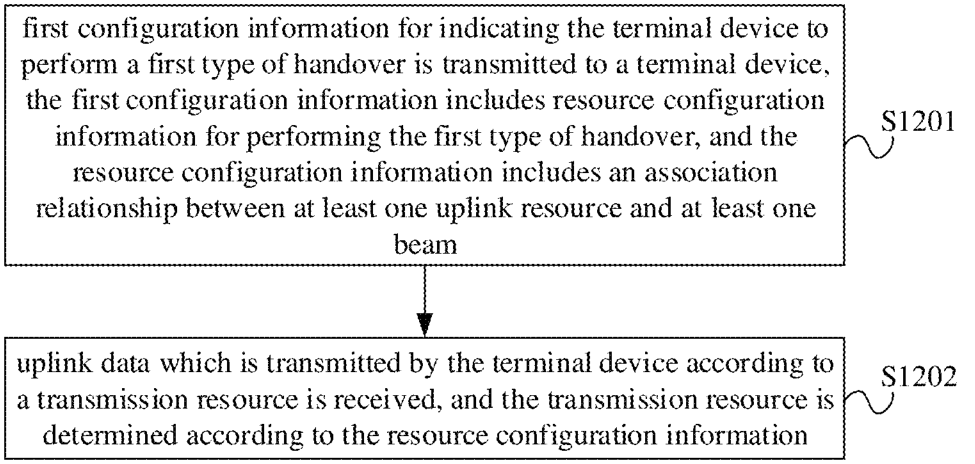
FIG. 12 is a second flowchart of a method for resource processing provided according to an embodiment of the present disclosure.

The above-mentioned embodiments describe implementations on the terminal device side, and the implementations on the network device side are described below with reference to FIG. 12, and FIG. 12 is a second flowchart of a method for resource processing provided according to an embodiment of the present disclosure.

As shown in FIG. 12, the method includes the following operations.

At S1201, first configuration information for indicating a terminal device to perform a first type of handover is transmitted to a terminal device, the first configuration information includes resource configuration information for performing the first type of handover, and the resource configuration information includes an association relationship between at least one uplink resource and at least one beam.

In the present embodiment, the network device may transmit the first configuration information to the terminal device, and the implementation of the first configuration information is similar to that described in the above-mentioned embodiment and will not be described here.

At S1202, uplink data transmitted by the terminal device based on a transmission resource is received, and the transmission resource is determined based on the resource configuration information.

After transmitting the first configuration information to the terminal device, the uplink data transmitted by the terminal device on the transmission resource determined based on the resource configuration information can be received, and various possible implementations thereof are similar to those described above and will not be described here.

The method for resource processing provided according to the embodiment of the present disclosure includes that: first configuration information is transmitted to a terminal device, the first configuration information is used for indicating the terminal device to perform a first type of handover, the first configuration information includes resource configuration information for performing the first type of handover, and the resource configuration information includes an association relationship between at least one uplink resource and at least one beam; uplink data transmitted by the terminal device based on a transmission resource is received, and the transmission resource is determined based on the resource configuration information. By indicating the association relationships between the uplink resources and the beams based on the first configuration information, the first configuration information indicating the terminal device to perform the first type of handover, uplink data transmitted by the terminal device based on a transmission resource is received, and the transmission resource is determined based on the resource configuration information, so that during the handover process of the first type of handover, the determination of the transmission resource can be effectively implemented based on the selection and determination of beam information, thereby implementing the effective configuration of the resource for the communication between the UE and the target network.

Figure 13:
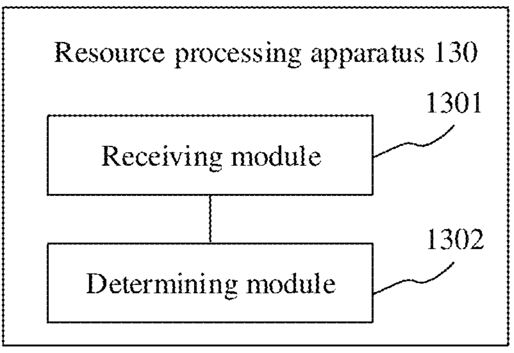
FIG. 13 is a structural schematic diagram of an apparatus for resource processing provided according to an embodiment of the present disclosure.

FIG. 13 is a structural schematic diagram of an apparatus for resource processing provided according to an embodiment of the present disclosure. Referring to FIG. 13, the resource processing apparatus 130 may include a receiving module 1301 and a determining module 1302.

The receiving module 1301 is configured to receive, from a network device, first configuration information for indicating a terminal device to perform a first type of handover, the first configuration information includes resource configuration information for performing the first type of handover, and the resource configuration information includes an association relationship between at least one uplink resource and at least one beam.

The determining module 1302 is configured to determine a transmission resource based on the resource configuration information, and the transmission resource is used for the terminal device to transmit uplink data.

In a possible implementation, the at least one uplink resource is a preconfigured Configured Grant (CG) resource, or the at least one uplink resource is a dynamic scheduling resource.

In a possible implementation, in case that the at least one uplink resource is the preconfigured CG resource, the resource configuration information further includes at least one of: carrier information, or a first threshold corresponding to a beam quality.

In a possible implementation, the determining module 1302 is specifically configured to:

- determine a first Bandwidth Part (BWP), the first BWP is any one of: an initial BWP, a BWP configured with the preconfigured CG resource, or a BWP indicated by a first parameter, the first parameter is configured by a network or specified by a protocol;
- determine at least one first CG resource based on the carrier information, and the first CG resource is a CG resource on the first BWP;
- determine a second CG resource from the at least one first CG resource based on the association relationship and the first threshold; and
- determine the transmission resource based on the second CG resource.

In a possible implementation, the carrier information includes first indication information;

- the first indication information indicates the terminal device to use a NUL, and a CG resource is configured on the NUL; or
- the first indication information indicates the terminal device to use a SUL, and a CG resource is configured on the SUL.

In a possible implementation, the determining module 1302 is specifically configured to:

- determine the CG resource configured on the NUL indicated by the first indication information as the first CG resource; or
- determine the CG resource configured on the SUL indicated by the first indication information as the first CG resource.

In a possible implementation, the carrier information includes a CG resource configured on a NUL, a CG resource configured on a SUL and a second threshold.

In a possible implementation, the determining module 1302 is specifically configured to:

- in case that cell quality information is less than the second threshold, determine the CG resource configured on the SUL as the first CG resource; or
- in case that cell quality information is greater than or equal to the second threshold, determine the CG resource configured on the NUL as the first CG resource,
- the cell quality information includes a Reference Signal Receiving Power (RSRP) for a downlink path loss reference and/or a Reference Signal Receiving Quality (RSRQ) for the downlink path loss reference.

In a possible implementation, the carrier information includes a CG resource configured on a NUL, and the determining module 1302 is specifically configured to:

- determine the CG resource configured on the NUL as the first CG resource.

In a possible implementation, the carrier information includes a CG resource configured on a SUL, the determining module is specifically configured to:

- determine the CG resource configured on the SUL as the first CG resource.

In a possible implementation, the determining module 1302 is specifically configured to:

- determine beam quality information corresponding to each beam, the beam quality information includes SS-RSRP and/or CSI-RSRP;
- determine at least one beam with beam quality information greater than the first threshold as candidate beam(s);
- determine a target beam from the at least one candidate beam; and
- determine at least one first CG resource corresponding to the target beam in the association relationship as the second CG resource.

In a possible implementation, the target beam is a beam with strongest beam channel quality among the candidate beam(s); or

- the target beam is a beam randomly selected from the candidate beam(s).

In a possible implementation, the determining module 1302 is further configured to:

- in case that the beam quality information corresponding to each beam is less than or equal to the first threshold, perform any one of the following operations:
- determining any beam configured with a CG resource as the target beam, and determining the CG resource corresponding to the target beam as the transmission resource;
- initiating a random access procedure to a target cell; or
- initiating a connection re-establishment process to a target cell or a source cell.

In a possible implementation, the determining module 1302 is specifically configured to:

- determine, from second CG resources, a second CG resource with time domain position closest to the present time as the transmission resource; or
- determine a second CG resource randomly selected from second CG resources as the transmission resource.

In a possible implementation, the preconfigured CG resource includes a first type of CG resource and/or a second type of CG resource.

In a possible implementation, in case that the preconfigured CG resource includes the second type of CG resource, the receiving module 1301 is specifically configured to:

- receive, from the network device, a second message for activating the second type of CG resource.

In a possible implementation, the resource configuration information and/or the second message further includes at least one of: a time domain resource, a frequency domain resource, a demodulation reference signal, an open loop power control, a modulation and coding scheme, a waveform, a redundant version, repetition times, a frequency modulation, and an HARQ process.

In a possible implementation, in case that the at least one uplink resource is the dynamic scheduling resource, the resource configuration information further includes at least one of: a time-frequency position of a first dynamic scheduling resource, a redundant version of the first dynamic scheduling resource, repetition times of the first dynamic scheduling resource, a frequency modulation of the first dynamic scheduling resource, and an HARQ process of the first dynamic scheduling resource; and the transmission resource is the first dynamic scheduling resource, and at least one beam associated with the first dynamic scheduling resource is included in the association relationship.

In a possible implementation, the resource configuration information includes first beam information for indicating a first beam used for monitoring a third message, and the third message is used for indicating a second dynamic scheduling resource and at least one beam associated with the second dynamic scheduling resource.

In a possible implementation, the determining module 1302 is specifically configured to:

receive the third message based on the first beam information; and determine the second dynamic scheduling resource indicated by the third message as the transmission resource.

In a possible implementation, the first type of handover is an RACH-less handover.

In a possible implementation, the first configuration information is an RRC message.

In a possible implementation, the second message is any one of: an RRC message, DCI, or an MAC CE.

In a possible implementation, the beam is any one of: a Synchronization Signal and physical broadcast channel block (SSB), a CSI-RS, an SRS, a TCI condition and a spatial relationship.

The resource processing apparatus provided according to the embodiment of the present disclosure can perform the technical solutions shown in the above method embodiments, and their implementation principles and beneficial effects are similar, so it will not be repeated here.

Figure 14:
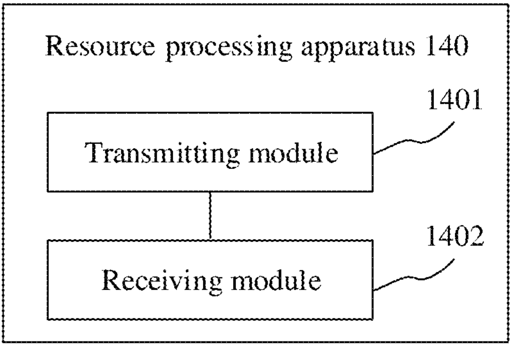
FIG. 14 is a structural schematic diagram of an apparatus for resource processing provided according to an embodiment of the present disclosure.

FIG. 14 is a structural schematic diagram of an apparatus for resource processing provided according to an embodiment of the present disclosure. Referring to FIG. 14, the resource processing apparatus 140 may include a transmitting module 1401 and a receiving module 1402.

The transmitting module 1401 is configured to transmit, to a terminal device, first configuration information for indicating a terminal device to perform a first type of handover, the first configuration information includes resource configuration information for performing the first type of handover, and the resource configuration information includes an association relationship between at least one uplink resource and at least one beam.

The receiving module 1402 is configured to receive uplink data which is transmitted by the terminal device based on a transmission resource, and the transmission resource is determined based on the resource configuration information.

In a possible implementation, the at least one uplink resource is a preconfigured Configured Grant (CG) resource, or the at least one uplink resource is a dynamic scheduling resource.

In a possible implementation, in case that the at least one uplink resource is the preconfigured CG resource, the resource configuration information further includes carrier information and/or a first threshold corresponding to a beam quality.

In a possible implementation, the transmission resource is determined based on a second CG resource, the second CG resource is determined from the at least one first CG resource based on the association relationship and the first threshold, the first CG resource is determined from a CG resource on a first BWP based on carrier information, and the first BWP is any one of: an initial BWP, a BWP configured with the preconfigured CG resource, or a BWP indicated by a first parameter, the first parameter is configured by a network or specified by a protocol.

In a possible implementation, the carrier information includes first indication information;

the first indication information indicates the terminal device to use a NUL, and a CG resource is configured on the NUL; or the first indication information indicates the terminal device to use an SUL, and a CG resource is configured on the SUL.

In a possible implementation, the first CG resource is the CG resource configured on the NUL indicated by the first indication information; or the first CG resource is the CG resource configured on the SUL indicated by the first indication information.

In a possible implementation, the carrier information includes a CG resource configured on a NUL, a CG resource configured on an SUL and a second threshold.

In a possible implementation, in case that cell quality information is less than the second threshold, the first CG resource is the CG resource configured on the SUL; or in case that cell quality information is greater than or equal to the second threshold, the first CG resource is the CG resource configured on the NUL, the cell quality information includes a Reference Signal Receiving Power (RSRP) for a downlink path loss reference and/or a Reference Signal Receiving Quality (RSRQ) for the downlink path loss reference.

In a possible implementation, the carrier information includes a CG resource configured on a NUL; the first CG resource is the CG resource configured on the NUL.

In a possible implementation, the carrier information includes a CG resource configured on an SUL; the first CG resource is the CG resource configured on the SUL.

In a possible implementation, the second CG resource is at least one first CG resource corresponding to a target beam in the association relationship, the target beam is determined from at least one candidate beam, the candidate beam(s) is at least one beam with beam quality information greater than the first threshold, and the beam quality information includes at least one of: Synchronization Signal Reference Signal Receiving Power (SS-RSRP) and Channel State Information Reference Signal Receiving Power (CSI-RSRP).

In a possible implementation, the target beam is a beam with strongest beam channel quality among the candidate beam(s); or the target beam is a beam randomly selected from the candidate beam(s).

In a possible implementation, in case that the beam quality information corresponding to each beam is less than or equal to the first threshold, the target beam is any beam configured with a CG resource, and the transmission resource is the CG resource corresponding to the target beam;

a random access procedure is performed with the terminal device; or a connection re-establishment process is performed with the terminal device.

In a possible implementation, the transmission resource is a second CG resource with time domain position closest to the present time among second CG resources; or the transmission resource is a second CG resource randomly selected from second CG resources.

In a possible implementation, the preconfigured CG resource includes a first type of CG resource and/or a second type of CG resource.

In a possible implementation, in case that the preconfigured CG resource includes the second type of CG resource, the transmitting module 1401 is further configured to:

transmit, to the terminal device, a second message for activating the second type of CG resource.

In a possible implementation, the resource configuration information and/or the second message further includes at least one of: a time domain resource, a frequency domain resource, a demodulation reference signal, an open loop power control, a modulation and coding scheme, a waveform, a redundant version, repetition times, a frequency modulation, or a Hybrid Automatic Repeat reQuest (HARQ) process.

In a possible implementation, in case that the at least one uplink resource is the dynamic scheduling resource, the resource configuration information further includes at least one of: a time-frequency position of a first dynamic scheduling resource, a redundant version of the first dynamic scheduling resource, repetition times of the first dynamic scheduling resource, a frequency modulation of the first dynamic scheduling resource, and an HARQ process of the first dynamic scheduling resource; and the transmission resource is the first dynamic scheduling resource, and at least one beam associated with the first dynamic scheduling resource is included in the association relationship.

In a possible implementation, the resource configuration information includes first beam information for indicating a first beam used for monitoring a third message, and the third message is used for indicating a second dynamic scheduling resource and at least one beam associated with the second dynamic scheduling resource.

In a possible implementation, the transmission resource is the second dynamic scheduling resource indicated by the third message, and the third message is transmitted on the first beam indicated by the first beam information.

In a possible implementation, the first type of handover is an RACH-less handover.

In a possible implementation, the first configuration information is an RRC message.

In a possible implementation, the second message is any one of: an RRC message, DCI, or an MAC CE.

In a possible implementation, the beam is any one of: a Synchronization Signal and physical broadcast channel block (SSB), a CSI-RS, an SRS, a TCI condition and a spatial relationship.

Figure 15:
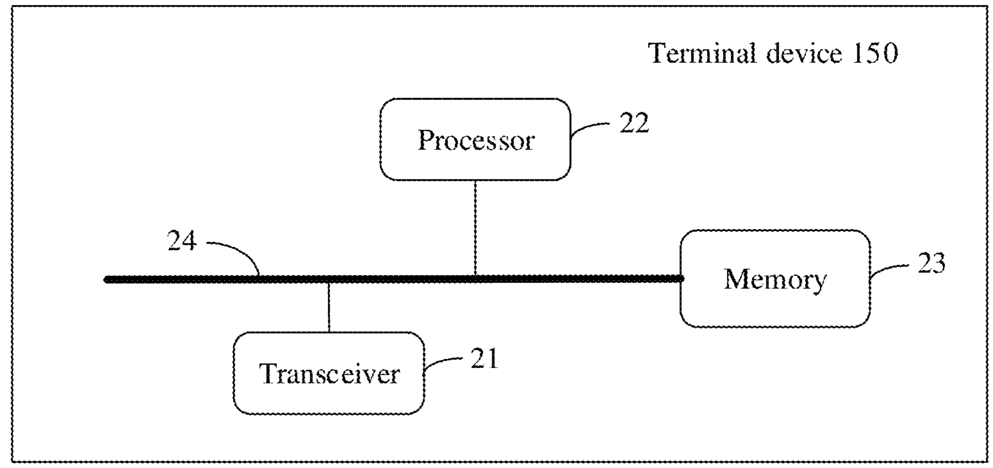
FIG. 15 is a structural schematic diagram of a terminal device provided according to an embodiment of the present disclosure.

FIG. 15 is a structural schematic diagram of a terminal device provided according to an embodiment of the present disclosure. Referring to FIG. 15, the terminal device 150 may include a transceiver 21, a memory 22 and a processor 23. The transceiver 21 may include a transmitter and/or a receiver. The transmitter may also be referred to as a sender, a sending set, a transmitting port or a transmitting interface or the like, and the receiver may also be referred to as a sink, a receiving set, a receiving port or a receiving interface or the like. Exemplarily, for the transceiver 21, the memory 22, the processor 23, the respective parts are connected to each other via a bus 24.

The memory 22 is used for storing program instructions.

The processor 23 is used perform the program instructions stored in the memory, causing the terminal device 150 to perform the resource processing method shown above.

The receiver of the transceiver 21 can be used to perform the receiving function of the terminal device in the resource processing method.

Figure 16:
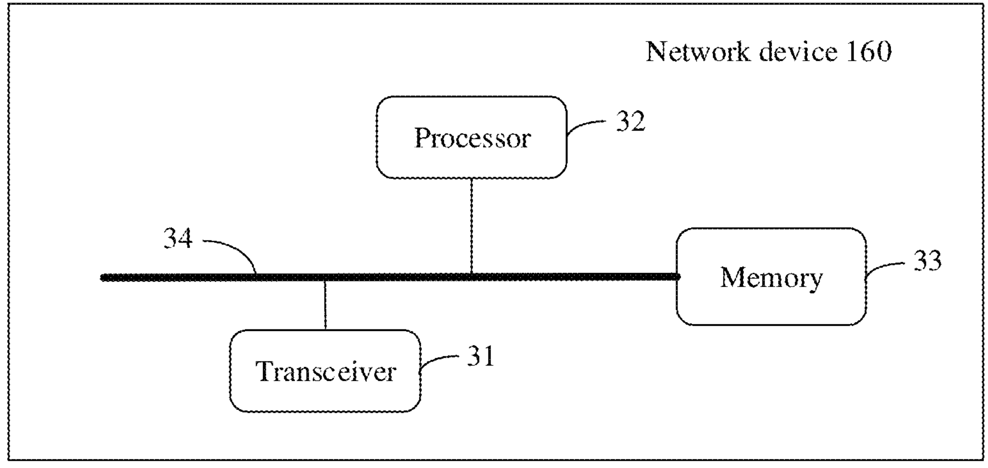
FIG. 16 is a structural schematic diagram of a network device provided according to an embodiment of the present disclosure.

FIG. 16 is a structural schematic diagram of a network device provided according to an embodiment of the present disclosure. Referring to FIG. 16, the network device 160 may include a transceiver 31, a memory 32 and a processor 33. The transceiver 31 may include a transmitter and/or a receiver. The transmitter may also be referred to as a sender, a sending set, a transmitting port or a transmitting interface or the like, and the receiver may also be referred to as a sink, a receiving set, a receiving port or a receiving interface or the like. Exemplarily, for the transceiver 31, the memory 32, the processor 33, the respective parts are connected to each other via a bus 34.

The memory 32 is used for storing program instructions.

The processor 33 is used perform the program instructions stored in the memory, causing the network device 160 to perform the resource processing method shown above.

The receiver of the transceiver 31 can be used to perform the receiving function of the network device in the resource processing method.

An embodiment of the present disclosure provides a computer readable storage medium having stored thereon computer-executed instructions that when executed by a processor, implement the resource processing method described above.

An embodiment of the present disclosure may also provide a computer program product, which may be executed by a processor. When the computer program product is executed, the resource processing method executed by the terminal device or the network device as described above can be implemented.

The terminal device, the computer readable storage medium and the computer program product in the embodiments of the present disclosure can execute the resource processing methods described in the above embodiments, and the specific implementation process and beneficial effects thereof are referred to above and will not be described here.

In several embodiments provided herein, it should be understood that the disclosed systems, apparatuses and methods may be implemented in other ways. For example, the above-described embodiment of the device is only schematic, for example, a division of the units is only a logical function division, and in practice, there may be another division mode, for example, multiple units or components may be combined or integrated into another system, or some features may be ignored or not performed. On the other hand, the coupling, direct coupling or a communication connection between each other shown or discussed may be an indirect coupling or communication connection through some interfaces, apparatus or units, and may be electrical, mechanical or other form.

The unit illustrated as a separate part may or may not be physically separated, and the part displayed as a unit may or may not be a physical unit, i.e. may be located in one place, or may be distributed over multiple network units. Part of or all of the units can be selected according to actual demands to achieve the purpose of the solution of the embodiment. In addition, each functional unit in each embodiment of the present disclosure may be integrated into one processing unit, each unit may also exist physically alone, or two or more units may be integrated into one unit. The integrated unit can be implemented either in a form of a hardware or in a form of a software functional unit.

Ordinary persons skilled in the art will appreciate that all of or part of the steps to implement the above-described method embodiments may be accomplished by hardware associated with program instructions. The computer programs can be stored in a computer readable storage medium. When the computer programs are executed by a processor, the steps of the above-mentioned method embodiments are implemented. The aforementioned storage media includes various media capable of storing program codes, such as a ROM, a RAM, a magnetic disk or an optical disk.

Finally, it should be noted that the above embodiments are only used to illustrate the technical solution of the present disclosure, but are not a limit to it. Although the present disclosure has been described in detail with reference to the foregoing embodiments, it should be understood by the ordinary person skilled in the art that the technical solution described in the foregoing embodiments can still be modified or some of or all of the technical features thereof can be equivalently replaced. These modifications or substitutions do not depart the essence of the corresponding technical solution from the scope of the technical solution in the embodiments of the present disclosure.

The invention claimed is:

1. A method for resource processing, performed by a terminal device, comprising:

receiving, from a network device, first configuration information for indicating the terminal device to perform a first type of handover, the first configuration information comprising resource configuration information for performing the first type of handover, and the resource configuration information comprising an association relationship between at least one uplink resource and at least one beam; and determining a transmission resource based on the resource configuration information, the transmission resource being used for the terminal device to transmit uplink data;

wherein the at least one uplink resource is a preconfigured Configured Grant (CG) resource, and the resource configuration information further comprises a first threshold corresponding to a beam quality, wherein determining the transmission resource based on the resource configuration information comprises:

determining a second CG resource from at least one first CG resource based on the association relationship and the first threshold, the at least one first CG resource being a CG resource on a first Bandwidth Part (BWP), and the first BWP being any one of: an initial BWP, a BWP configured with the preconfigured CG resource, or a BWP indicated by a first parameter, the first parameter being configured by a network or specified by a protocol; and determining the transmission resource based on the second CG resource.

2. The method of claim 1, wherein the preconfigured CG resource comprises at least one of a first type of CG resource.

3. The method of claim 1, wherein at least one of the resource configuration information further comprises at least one of: a time domain resource, a frequency domain resource, a demodulation reference signal, an open loop power control, a modulation and coding scheme, a waveform, a redundant version, repetition times, or a frequency modulation, or a Hybrid Automatic Repeat reQuest (HARQ) process.

4. The method of claim 1, wherein the first type of handover is a Random Access Channel-less (RACH-less) handover.

5. The method of claim 1, wherein the first configuration information is a Radio Resource Control (RRC) message.

6. The method of claim 1, wherein the beam is any one of: a Synchronization Signal and physical broadcast channel block (SSB), a Channel State Information Reference Signal (CSI-RS), a Sounding Reference Signal (SRS), a Transmission Configuration Indication (TCI) condition, or a spatial relationship.

7. The method of claim 1, wherein determining the second CG resource from the at least one first CG resource based on the association relationship and the first threshold comprises:

determining beam quality information corresponding to each beam, wherein the beam quality information comprises at least one of: Synchronization Signal Reference Signal Receiving Power (SS-RSRP) or Channel State Information Reference Signal Receiving Power (CSI-RSRP);

determining at least one beam with beam quality information greater than the first threshold as at least one candidate beam;

determining a target beam from the at least one candidate beam; and determining at least one first CG resource corresponding to the target beam in the association relationship as the second CG resource.

8. The method of claim 7, further comprising:

in case that the beam quality information corresponding to each beam is less than or equal to the first threshold, performing any one of the following operations:

determining any beam configured with a CG resource as the target beam, and determining the CG resource corresponding to the target beam as the transmission resource;

initiating a random access procedure to a target cell; or initiating a connection re-establishment process to a target cell or a source cell.

9. The method of claim 1, wherein determining the transmission resource based on the second CG resource comprises:

determining, from second CG resources, a second CG resource with a time domain position closest to a present time as the transmission resource.

10. A network device, comprising: a processor and a memory; wherein the memory is configured to store computer-executed instructions, and the processor is configured to execute the computer-executed instructions stored in the memory, to cause the network device to:

transmit, to a terminal device, first configuration information for indicating the terminal device to perform a first type of handover, the first configuration information comprising resource configuration information for performing the first type of handover, and the resource configuration information comprising an association relationship between at least one uplink resource and at least one beam; and receive uplink data which is transmitted by the terminal device based on a transmission resource, the transmission resource being determined based on the resource configuration information;

wherein the at least one uplink resource is a preconfigured Configured Grant (CG) resource, and the resource configuration information further comprises a first threshold corresponding to a beam quality, and wherein the transmission resource is determined based on a second CG resource, the second CG resource is determined from at least one first CG resource based on the association relationship and the first threshold, the at least one first CG resource is a CG resource on a first Bandwidth Part (BWP), and the first BWP is any one of: an initial BWP, a BWP configured with the preconfigured CG resource, or a BWP indicated by a first parameter, the first parameter is configured by a network or specified by a protocol.

11. The network device of claim 10, wherein the second CG resource is at least one first CG resource corresponding to a target beam in the association relationship, the target beam is determined from at least one candidate beam, the at least one candidate beam is at least one beam with beam quality information greater than the first threshold, and the beam quality information comprises at least one of: Synchronization Signal Reference Signal Receiving Power (SS-RSRP) or Channel State Information Reference Signal Receiving Power (CSI-RSRP).

12. The network device of claim 11, wherein in case that the beam quality information corresponding to each beam is less than or equal to the first threshold:

the target beam is any beam configured with a CG resource, and the transmission resource is the CG resource corresponding to the target beam; or a random access procedure is performed with the terminal device; or a connection re-establishment process is performed with the terminal device.

13. The network device of claim 10, wherein the transmission resource is a second CG resource with a time domain position closest to a present time among second CG resources.

14. A terminal device, comprising: a processor and a memory; wherein the memory is configured to store computer-executed instructions, and the processor is configured to execute the computer-executed instructions stored in the memory, to cause the terminal device to:

receive, from a network device, first configuration information for indicating a terminal device to perform a first type of handover, the first configuration information comprising resource configuration information for performing the first type of handover, and the resource configuration information comprising an association relationship between at least one uplink resource and at least one beam; and determine a transmission resource based on the resource configuration information, the transmission resource being used for the terminal device to transmit uplink data;

wherein the at least one uplink resource is a preconfigured Configured Grant (CG) resource, and the resource configuration information further comprises a first threshold corresponding to a beam quality, wherein the processor is configured to execute the computer-executed instructions stored in the memory, to cause the terminal device to:

determine a second CG resource from at least one first CG resource based on the association relationship and the first threshold, the at least one first CG resource being a CG resource on a first Bandwidth Part (BWP), and the first BWP being any one of: an initial BWP, a BWP configured with the preconfigured CG resource, or a BWP indicated by a first parameter, the first parameter being configured by a network or specified by a protocol; and determine the transmission resource based on the second CG resource.

15. The terminal device of claim 14, wherein at least one of the resource configuration information further comprises at least one of: a time domain resource, a frequency domain resource, a demodulation reference signal, an open loop power control, a modulation and coding scheme, a waveform, a redundant version, repetition times, or a frequency modulation, or a Hybrid Automatic Repeat reQuest (HARQ) process.

16. The terminal device of claim 14, wherein the first type of handover is a Random Access Channel-less (RACH-less) handover.

17. The terminal device of claim 14, wherein the processor is configured to execute the computer-executed instructions stored in the memory, to cause the terminal device to:

determine beam quality information corresponding to each beam, wherein the beam quality information comprises at least one of: Synchronization Signal Reference Signal Receiving Power (SS-RSRP) or Channel State Information Reference Signal Receiving Power (CSI-RSRP);

determine at least one beam with beam quality information greater than the first threshold as at least one candidate beam;

determine a target beam from the at least one candidate beam; and determine at least one first CG resource corresponding to the target beam in the association relationship as the second CG resource.

18. The terminal device of claim 17, wherein the processor is configured to execute the computer-executed instructions stored in the memory, to cause the terminal device to:

in case that the beam quality information corresponding to each beam is less than or equal to the first threshold, perform any one of the following operations:

determining any beam configured with a CG resource as the target beam, and determining the CG resource corresponding to the target beam as the transmission resource;

initiating a random access procedure to a target cell; or initiating a connection re-establishment process to a target cell or a source cell.

19. The terminal device of claim 14, wherein the preconfigured CG resource comprises at least one of a first type of CG resource.

20. The terminal device of claim 14, wherein the processor is configured to execute the computer-executed instructions stored in the memory, to cause the terminal device to:

determine, from second CG resources, a second CG resource with a time domain position closest to a present time as the transmission resource.

* * * * *